United States Patent
Lu et al.

(10) Patent No.: US 10,951,383 B2
(45) Date of Patent: Mar. 16, 2021

(54) METHOD AND APPARATUS FOR DETERMINING SLOT CONFIGURATION IN A WIRELESS COMMUNICATION SYSTEM

(71) Applicant: ASUSTek Computer Inc., Taipei (TW)

(72) Inventors: Chia-Chi Lu, Taipei (TW); Chun-Wei Huang, Taipei (TW); Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 158 days.

(21) Appl. No.: 16/409,206

(22) Filed: May 10, 2019

(65) Prior Publication Data

US 2019/0349180 A1    Nov. 14, 2019

Related U.S. Application Data

(60) Provisional application No. 62/670,553, filed on May 11, 2018.

(51) Int. Cl.
*H04W 72/04* (2009.01)
*H04W 74/08* (2009.01)
(Continued)

(52) U.S. Cl.
CPC ........ *H04L 5/0094* (2013.01); *H04L 27/2607* (2013.01); *H04W 24/08* (2013.01); *H04W 72/0446* (2013.01); *H04L 5/0007* (2013.01)

(58) Field of Classification Search
CPC ... H04L 5/0053; H04L 5/0048; H04L 5/0094; H04L 5/0051; H04L 5/001; H04L 5/0092;
(Continued)

(56) References Cited

U.S. PATENT DOCUMENTS 10,855,417 B2 * 12/2020 Chen ............... H04L 5/0053
2018/0139735 A1 * 5/2018 Akkarakaran ....... H04L 5/005
(Continued)

OTHER PUBLICATIONS

ETSR: "Remaining issues on slot format configuration", 3GPP Draft; R1-1802143, 3rd Generation Partnership Project (3GPP), Mobile Competence Centre ; 650, Route Des Lucioles ; F-06921 Sophia-Antipolis C vol. RAN WG1, No. Athens, Greece; Feb. 26, 2018-Mar. 2, 2018 Feb. 17, 2018 (Feb. 17, 2018), XP051397810.
(Continued)

*Primary Examiner* — Sai Aung
(74) *Attorney, Agent, or Firm* — Blue Capital Law Firm, P.C.

(57) ABSTRACT

A method and apparatus are disclosed from the perspective of a network. In one embodiment, the method includes the network configuring a UE (User Equipment) with a plurality of DL (Downlink) BWPs (Bandwidth Parts) of a serving cell, wherein the plurality of DL BWPs comprises a first DL BWP with a first SCS (Sub-Carrier Spacing) and a second DL BWP with a second SCS, wherein the second SCS is different from the first SCS. The method further includes the network configuring the UE with a first monitoring occasion for indicating slot format indication (SFI) in the first DL BWP by indicating a first slot offset and a first slot periodicity. The method also includes the network configuring the UE with a second monitoring occasion for indicating slot format indication (SFI) in the second DL BWP by indicating a second slot offset, and a second slot periodicity, wherein the network is not allowed to indicate the second slot offset and the second slot periodicity such that a time period containing a number of consecutive slots associated with a slot format in the combination of slot formats indicated by a SFI index in the second monitoring occasion does not align slot boundary of a slot with the first SCS, and wherein the number is the ratio of the second SCS to the first SCS.

20 Claims, 18 Drawing Sheets

(51) Int. Cl.
  *H04W 74/00* (2009.01)
  *H04L 5/00* (2006.01)
  *H04L 27/26* (2006.01)
  *H04W 24/08* (2009.01)

(58) Field of Classification Search
  CPC ... H04L 5/0007; H04L 5/0044; H04L 5/0091; H04L 5/10; H04L 5/1469; H04W 72/042; H04W 72/0446; H04W 74/0833; H04W 74/0808; H04W 74/006; H04W 16/14; H04W 72/1289; H04W 72/04; H04W 72/0453; H04W 24/08; H04W 76/27; H04W 72/14
  See application file for complete search history.

(56) References Cited

U.S. PATENT DOCUMENTS

| | | | | |
|---|---|---|---|---|
| 2020/0053785 A1* | 2/2020 | Kim | ............... | H04L 27/26 |
| 2020/0053786 A1* | 2/2020 | Kim | ............... | H04W 56/00 |
| 2020/0137792 A1* | 4/2020 | Yoon | ............... | H04L 5/0041 |
| 2020/0344762 A1* | 10/2020 | Takeda | ............... | H04W 76/11 |

OTHER PUBLICATIONS

"3rd Generation Partnership Project; Technical Specification Group Radio Access Network; NR; Physical layer procedures for control (Release 15)", 3GPP Standard; Technical Specification; 3GPP TS 38.213, 3rd Generation Partnership Project (3GPP), Mobile Competence Centre ; 650, Route Des Lucioles ; F-06921 Sophia-Antipolis Cedex ; France, vol. RAN WG1, No. V15.1.0, Apr. 8, 2018 (Apr. 8, 2018), pp. 1-77.

NTT Docomo et al: "Remaining details on group-common PDCCH", 3GPP Draft; R1-1720813, 3rd Generation Partnership Project (3GPP), Mobile Competence Centre ; 650, Route Des ; F-Q6921 Sophia-Antipolis Cedex ;France vol. RAN WG1, No. Reno, USA; Nov. 27, 2017-Dec. 1, 2017 Nov. 18, 2017 (Nov. 18, 2017), XP051370242.

European Search Report from corresponding EP Application No. 19173707.1, dated Sep. 16, 2019.

* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| ... | | | | | | | | | | | | | | |

FIG. 5A (PRIOR ART)

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| ... | | | | | | | | | | | | | | |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56 – 254 | Reserved | | | | | | | | | | | | | |
| 255 | Indicates 'D' or 'U' for flexible symbols in *tdd-UL-DL-ConfigurationCommon*, *tdd-UL-DL-ConfigurationCommon2*, or *tdd-UL-DL-ConfigDedicated* with receptions or with transmissions configured by higher layers, respectively Indicates same slot format as a slot format in the previous DCI format 2_0 transmission | | | | | | | | | | | | | |

FIG. 5B (PRIOR ART)

METHOD AND APPARATUS FOR DETERMINING SLOT CONFIGURATION IN A WIRELESS COMMUNICATION SYSTEM

CROSS-REFERENCE TO RELATED APPLICATIONS

The present application claims the benefit of U.S. Provisional Patent Application Ser. No. 62/670,553 filed on May 11, 2018, the entire disclosure of which is incorporated herein in its entirety by reference.

FIELD

This disclosure generally relates to wireless communication networks, and more particularly, to a method and apparatus for determining slot configuration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network. In one embodiment, the method includes the network configuring a UE (User Equipment) with a plurality of DL (Downlink) BWPs (Bandwidth Parts) of a serving cell, wherein the plurality of DL BWPs comprises a first DL BWP with a first SCS (Sub-Carrier Spacing) and a second DL BWP with a second SCS, wherein the second SCS is different from the first SCS. The method further includes the network configuring the UE with a first monitoring occasion for indicating slot format indication (SFI) in the first DL BWP by indicating a first slot offset and a first slot periodicity. The method also includes the network configuring the UE with a second monitoring occasion for indicating slot format indication (SFI) in the second DL BWP by indicating a second slot offset, and a second slot periodicity, wherein the network is not allowed to indicate the second slot offset and the second slot periodicity such that a time period containing a number of consecutive slots associated with a slot format in the combination of slot formats indicated by a SFI index in the second monitoring occasion does not align slot boundary of a slot with the first SCS, and wherein the number is the ratio of the second SCS to the first SCS.

BRIEF DESCRIPTION OF THE DRAWINGS

FIGS. 5A and 5B are a reproduction of Table 11.1.1-1 of 3GPP TS 38.213 V15.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: Final Chairman's Note of 3GPP TSG RAN WG1 Meeting #90bis (Prague, CZ, 9-13 Oct. 2017) (updated with email approvals); Final Chairman's Note of 3GPP TSG RAN WG1 Meeting #91 (Reno, USA, 27 Nov.-1 Dec. 2017); Final Chairman's Note of 3GPP TSG RAN WG1 Meeting AH1801 (Vancouver, Canada, 22-26 Jan. 2018); Final Chairman's Note of 3GPP TSG RAN WG1 Meeting #92 (Athens, Greece, Feb. 26-Mar. 2, 2018); Final Chairman's Note of 3GPP TSG RAN WG1 Meeting #92bis (Sanya, China, 16-20 Apr. 2018); TS 38.213 V15.1.0 (2018 April), "NR; Physical layer procedures for control (Release 15)"; and TS 38.331 V15.1.0 (2018 March), "NR; Radio Resource Control (RRC) protocol specification (Release 15)". The standards and documents listed above are hereby expressly incorporated by reference in their entirety.

Figure 1:
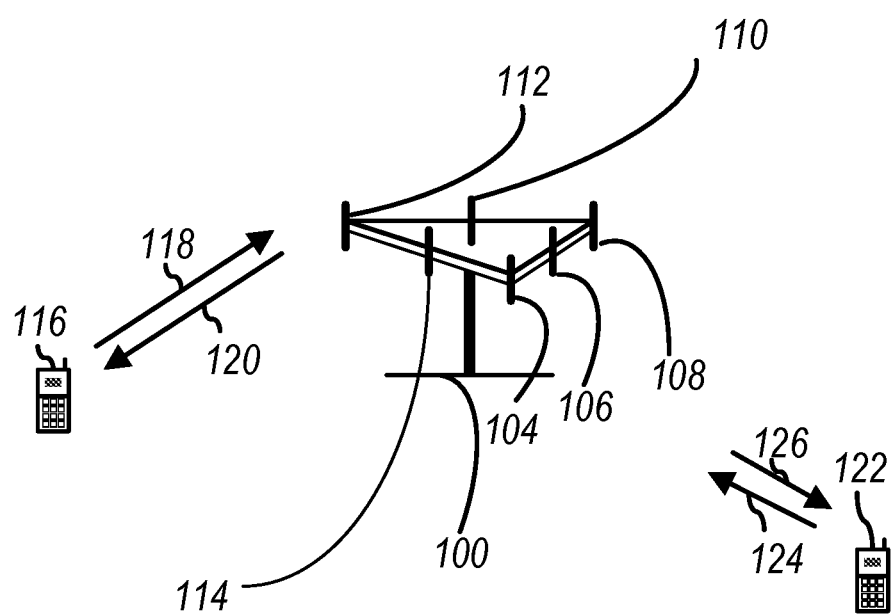
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
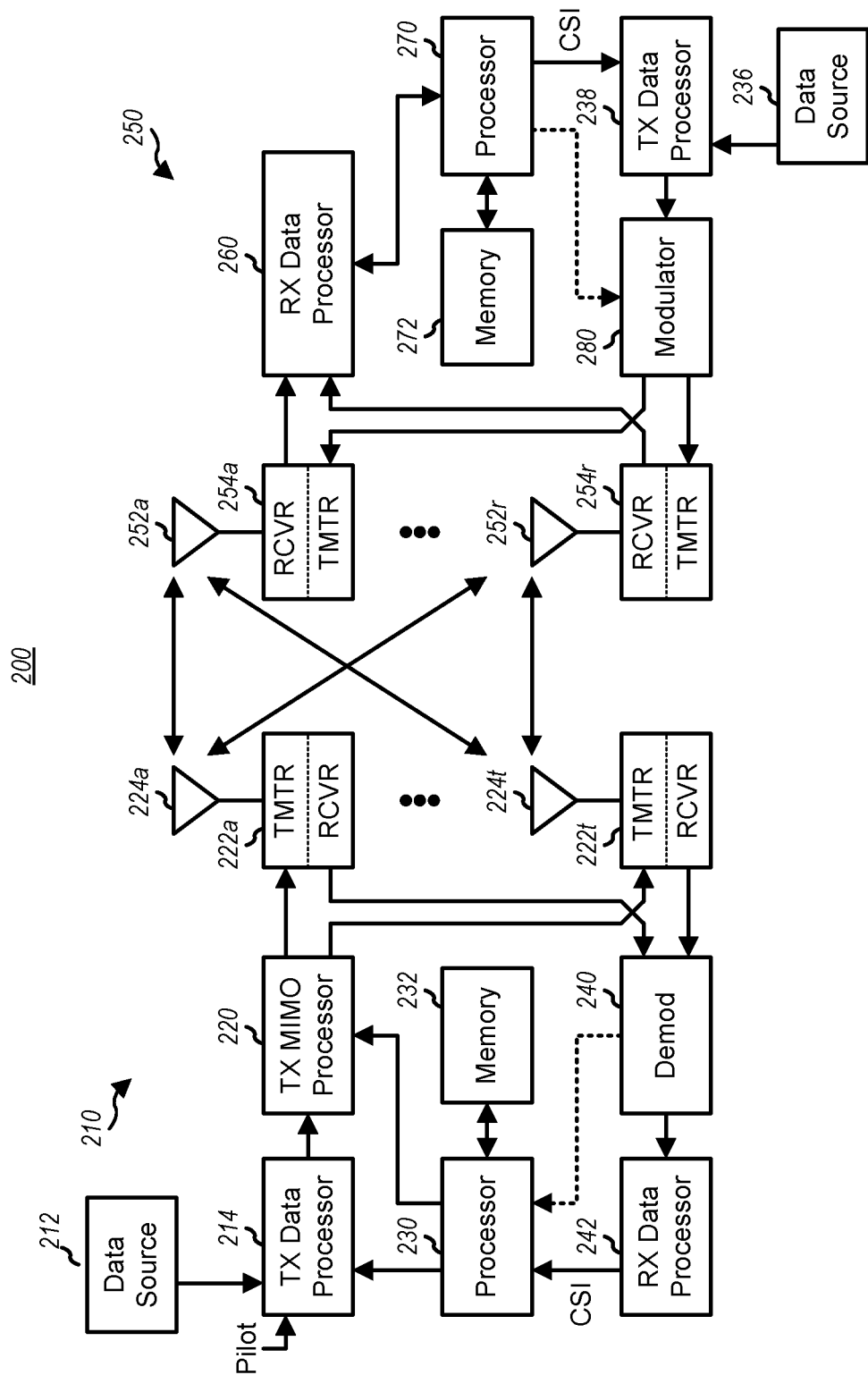
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
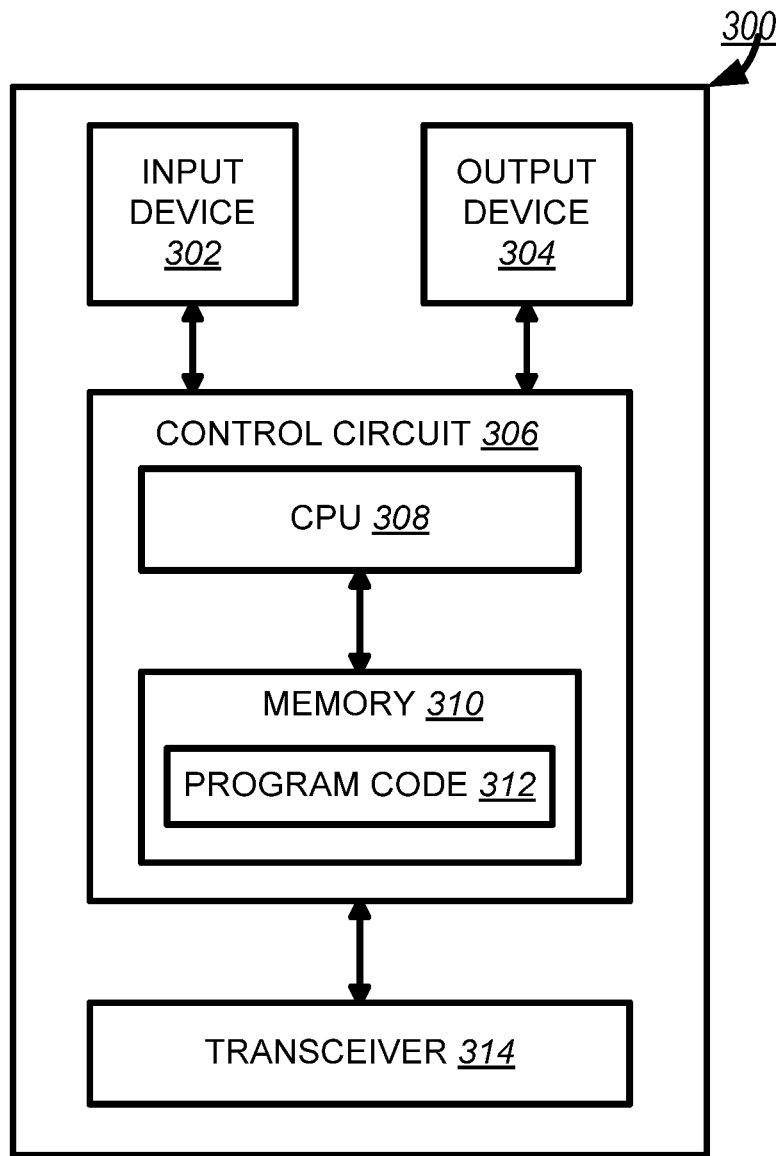
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
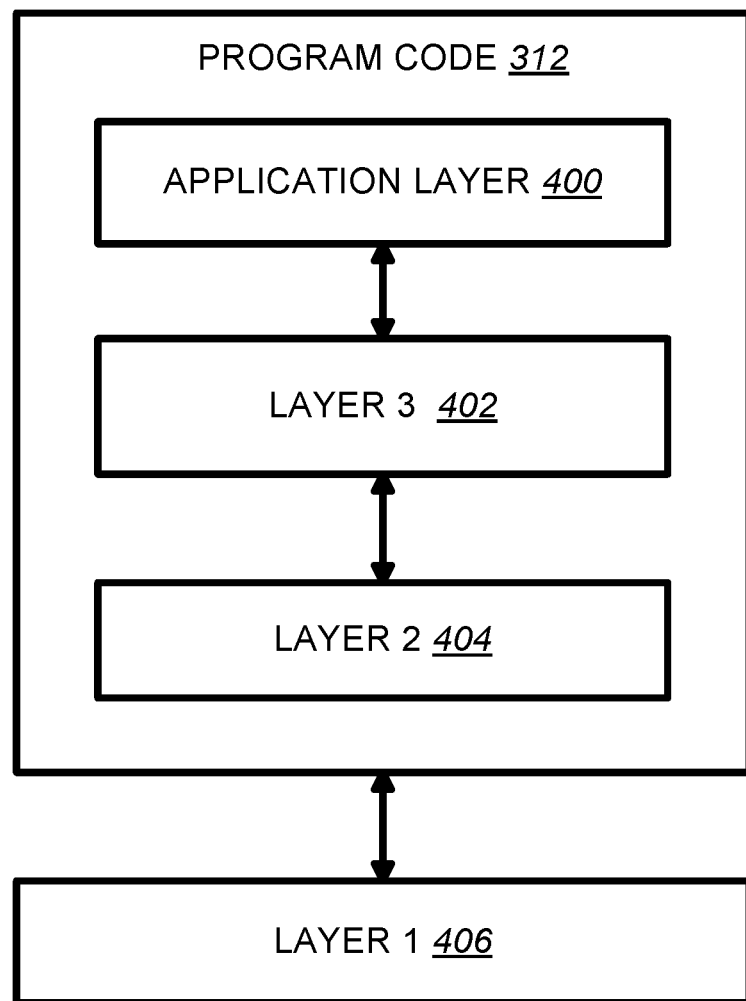
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Some agreements on GC-PDCCH (Group Common-Physical Downlink Control Channel) and SFI (Slot Format related Information) in the RAN1 #90bis meeting are described in the Final Chairman's Note of 3GPP TSG RAN WG1 Meeting #90bis (Prague, CZ, 9-13 Oct. 2017) (updated with email approvals) as follows:

Agreement:
  For GC-PDCCH monitoring, confirm the working assumption
    UE can be configured to monitor SFI in group common PDCCH for a Scell on a different cell Thursday Agreements:
  For cross cell GC-PDCCH monitoring, support by RRC configuration for a UE the following:
    The same SFI can be applicable to more than one cell
    Different SFI fields in one GC-PDCCH can be applied to different cells
    FFS interaction with multiple BWP configuration per cell Agreements:
  The UE is not expected to have conflict on link (DL or UL) direction between that of dynamic SFI and that of UE specific data (UE specific DCI triggered PDSCH, PUSCH (grant-based), and PUCCH with A/N for a PDSCH) in Rel-15
    Note: a link direction denoted as "unknown" in dynamic SFI is not deemed as in conflict with DL or UL Agreements:
  The single slot format table supports up to two D/U switching points per slot
    Zero switching point: 14 DL symbols, or 14 unknown symbols, or 14 UL symbols.
    One D/U switching point of all combinations: Start with zero or more DL symbols, end with zero or more UL symbols, and with unknown symbols in between, where there is at least one unknown symbol and one DL or UL symbol.
    Two D/U switching points within a slot: The first 7 symbols start with zero or more DL symbols, ends with at least one UL symbol at symbol #6 with zero or more unknown symbols in between. The second 7 symbols starts with one or more DL symbols and ends with zero or more UL symbols with zero or more unknown symbols in the middle.
    Note: This single slot format table will be captured in RAN1 spec. In Rel.15, RAN1 will specify up to X<[256] entries, but the RRC signaling need to consider future compatibility with more entries and from RAN1 perspective, a total of [256] entries in the RRC signalling is necessary (with only X entries specified in Rel-15 in RAN1)

Agreements:
  gNB configures a per serving cell GC-PDCCH (for dynamic SFI) monitoring periodicity of K slots (based on GC-PDCCH numerology), up to 8 choices
    K=1, 2, 5, 10, 20

Agreements:
  For the UE specific single-slot/multi-slotset SFI table configuration
    Each entry of the table indicates a sequence of configured single-slot slot formats
      Note if the sequence length is 1, the entry is a single-slot slot format
      Note if the sequence length is more than one, the entry is a multi-slot slot format
      Note that it is possible all the slots in a multi-slot slot-format can have the same slot format
      Note The entries in the table can be of different length including a mix of single slot SFI and multi-slot SFI
        The length of each entry in the table is FFS, e.g., multiple of configured GC-PDCCH monitoring period, a fraction of the configuration GC-PDCCH monitoring period, etc.

Agreements:
  GC-PDCCH for dynamic SFI monitoring
    For same cell GC-PDCCH monitoring: UE is required to monitor at most one GC-PDCCH per spatial QCL per configuration period carrying dynamic SFI in the active BWP in the cell
    The coreset(s) is located in the first 1/2/3 symbols in a slot
    Configuration of GC-PDCCH for UE to monitor is FFS especially considering interaction with BWP configuration
    Note: This is not intended to address the case of multi-TRP which is deprioritized before December
    When configuring the GC-PDCCH monitoring for dynamic SFI, the gNB will configure the payload length
    When configuring the GC PDCCH monitoring for dynamic SFI for a serving cell, the gNB will configure the location of the bits used for the dynamic SFI in the payload Agreements:
  For the cell-specific higher layer signalling on semi-static DL/UL assignment, the transmission indication is in pattern of DL-unknown-UL. The signaling include:
    For DL resources indication, the signaling include:
      Number of full DL slot(s) (x1) at the beginning of the period. Values for x1 include {0, 1, . . . , (Number of slots in a UL-DL switching periodicity)}
      Number of DL symbol(s) follow the full DL slots (x2). Values for x2 include {0, 1, . . . , 13}
    For UL resource indication, the signaling include:
      Number of full UL slot(s) (y1) at the end of the period. Values for y1 include {0, 1, . . . , (Number of slots in a UL-DL switching periodicity)}
      Number of UL symbol(s) (y2) preceeds full UL slots. Values for y2 include {0, 1, . . . , 13}
    The resource(s) in a period between DL and UL segments are unknown resources.

FFS The UE does not receive and not transmit on 'Unknown' resources in cell-specific higher layer signalling if not otherwise indicated.

Agreements:

For the UE-specific higher layer signalling on semi-static DL/UL assignment,

The signaling includes the indication as per slot basis, the signalling includes:

Number of DL symbol(s) (y3) in the beginning of slot No. x3
Values for x3 include $\{1, \ldots, \text{(Number of slots in a UL-DL switching periodicity)}\}$
Values for y3 include $\{0, 1, \ldots, 13, 14\}$
Number of UL symbol(s) (y4) in end of slot No. x4
Values for x4 include $\{1, \ldots, \text{(Number of slots in a UL-DL switching periodicity)}\}$
Values for y4 include $\{0, 1, \ldots, 13, 14\}$
The resource(s) in a slot without DL/UL indication are unknown resource(s).

FFS the UE does not receive and not transmit on 'Unknown' resources in UE-specific higher layer signalling if not otherwise indicated.

FFS At most single DL/UL switching point exists in a UL-DL switching periodicity.

Agreement: GC-PDCCH for SFI is Associated with a SFI RNTI by Configuration

Some agreements on GC-PDCCH (Group Common-Physical Downlink Control Channel) and SFI (Slot Format related Information) in the RAN1 #91 meeting are described in the Final Chairman's Note of 3GPP TSG RAN WG1 Meeting #91 (Reno, USA, 27 Nov.-1 Dec. 2017) below. A working assumption has been reached on some rules for determining the SFI table.

R1-1721402 Email Discussion Summary for SFI Qualcomm

Agreements:

A reference SCS is signaled together with cell-specific DL/UL assignment link configured period in ms and configured pattern (x1, x2, y1, y2) is slots/symbols
For Rel 15, the same reference SCS is applied to UE-specific DL/UL assignment link configured period in ms and configured pattern (x3, x4, y3, y4) is slots/symbols
For GC-PDCCH monitoring, the period is GC-PDCCH SCS dependent
For 15 KHz SCS (slots based on 15 kHz): 1, 2, 5, 10, 20
For 30 KHz SCS (slots based on 30 kHz): 1, 2, 4, 5, 10, 20
For 60 KHz SCS (slots based on 60 kHz): 1, 2, 4, 5, 10, 20
For 120 KHz SCS (slots based on 120 kHz): 1, 2, 4, 5, 10, 20

Agreements:

For the cell-specific RRC configuration of the semi-static DL/UL assignment,
Add additional periodicity 0.625 ms (for 120 KHz SCS only), 1.25 ms (for >=60 KHz SCS), and 2.5 ms (for >=30 KHz SCS)
Also support 2 concatenated DL-unknown-UL periodicity
Add 1 bit in semi-static DL/UL assignment to indicate if the second periodicity is included
The two periodicities form X ms+Y ms total periodicity, where X, and Y are from $\{0.5, 0.625, 1, 1.25, 2, 2.5, 5, 10\}$ ms
When two perodicities are included, the corresponding parameters are independently configured.
Note: it will be discussed to preclude some combinations (no additional higher-layer impact)

Agreements:

On SSB transmission
SSB transmission can happen in semi-static DL
SSB transmission can happen in semi-static unknown
Symbols configured to transmit SSB cannot be overwritten to UL Agreements:

The reception of DL one-slot UE-specific data not semi-statically configured by RRC and measurement related signals not semi-statically configured by RRC cannot be overridden by "unknown" in dynamic SFI
FFS the case of DL multi-slot UE-specific data not semi-statically configured by RRC Agreements:

In a UE PDCCH monitoring occasion, if dynamic SFI "unknown" is received (not overwritten) for at least one symbol configured for UE PDCCH, the UE is not expected to monitor the PDCCH Working Assumption:

For the SFI table, capture the following:
For information only:
Include entries with all D, all U and all unknown (X)
For the slot format with single switching point
For short consecutive DL, consider up to 3 DL symbols
For short consecutive UL, consider up to 2 UL symbols
For short consecutive unknown, consider up to 3 unknown symbols
With DL and unknown:
DL dominant: X starts in symbol 11, 12, 13 or 14 and ends in symbol 14
Unknown dominant: X starts in symbol 2, 3, or 4 and ends in symbol 14
With unknown and UL
Unknown dominant: X starts in symbol 1 and ends in symbol 12 or 13
UL dominant: X starts in symbol 1 and ends in symbol 1, 2, 3, 4, 5, 6
With DL, unknown and UL:
DL dominant: X in symbol $\{13\}$, $\{12, 13\}$, $\{11, 12, 13\}$, $\{12\}$, $\{11, 12\}$, $\{10, 11, 12\}$
Unknown dominant: X starts in symbol 2, 3, or 4 and ends in symbol 12 or 13
UL dominant: X in symbol $\{2\}$, $\{3\}$, $\{4\}$, $\{2,3\}$, $\{3,4\}$, $\{4,5\}$, $\{2,3,4\}$, $\{3,4,5\}$, $\{4,5,6\}$
Additional to match LTE special subframe patterns: 9-4-1, 6-6-2, 6-2-6
Special case: 1-3 D in the beginning and 3 U in the end
For the slot format with two switching points
Consider symmetric two half slots
For short consecutive DL, consider up to 2 DL symbols
For short consecutive UL, consider up to 1 UL symbols
For short consecutive unknown, consider up to 2 unknown symbols
Additional entries can still be discussed and introduced in Rel-15
The indexing may be further adjusted

|    | 1 | 2 | 3 | 4 | 5 | 6 | 7 | 8 | 9 | 10 | 11 | 12 | 13 | 14 |
|----|---|---|---|---|---|---|---|---|---|----|----|----|----|----|
| 0  | D | D | D | D | D | D | D | D | D | D  | D  | D  | D  | D  |
| 1  | U | U | U | U | U | U | U | U | U | U  | U  | U  | U  | U  |
| 2  | X | X | X | X | X | X | X | X | X | X  | X  | X  | X  | X  |
| 3  | D | D | D | D | D | D | D | D | D | D  | D  | D  | D  | X  |
| 4  | D | D | D | D | D | D | D | D | D | D  | D  | D  | X  | X  |
| 5  | D | D | D | D | D | D | D | D | D | D  | D  | X  | X  | X  |
| 6  | D | D | D | D | D | D | D | D | D | D  | X  | X  | X  | X  |
| 7  | D | D | D | D | D | D | D | D | D | X  | X  | X  | X  | X  |
| 8  | X | X | X | X | X | X | X | X | X | X  | X  | X  | X  | U  |
| 9  | X | X | X | X | X | X | X | X | X | X  | X  | X  | U  | U  |
| 10 | X | U | U | U | U | U | U | U | U | U  | U  | U  | U  | U  |
| 11 | X | X | U | U | U | U | U | U | U | U  | U  | U  | U  | U  |
| 12 | X | X | X | U | U | U | U | U | U | U  | U  | U  | U  | U  |
| 13 | X | X | X | X | U | U | U | U | U | U  | U  | U  | U  | U  |
| 14 | X | X | X | X | X | U | U | U | U | U  | U  | U  | U  | U  |
| 15 | X | X | X | X | X | U | U | U | U | U  | U  | U  | U  | U  |
| 16 | D | X | X | X | X | X | X | X | X | X  | X  | X  | X  | X  |
| 17 | D | D | X | X | X | X | X | X | X | X  | X  | X  | X  | X  |
| 18 | D | D | D | X | X | X | X | X | X | X  | X  | X  | X  | X  |
| 19 | D | X | X | X | X | X | X | X | X | X  | X  | X  | X  | U  |
| 20 | D | D | X | X | X | X | X | X | X | X  | X  | X  | X  | U  |
| 21 | D | D | D | X | X | X | X | X | X | X  | X  | X  | X  | U  |
| 22 | D | X | X | X | X | X | X | X | X | X  | X  | X  | U  | U  |
| 23 | D | D | X | X | X | X | X | X | X | X  | X  | X  | U  | U  |
| 24 | D | D | D | X | X | X | X | X | X | X  | X  | X  | U  | U  |
| 25 | D | X | X | X | X | X | X | X | X | X  | X  | U  | U  | U  |
| 26 | D | D | X | X | X | X | X | X | X | X  | X  | U  | U  | U  |
| 27 | D | D | D | X | X | X | X | X | X | X  | X  | U  | U  | U  |
| 28 | D | D | D | D | D | D | D | D | D | D  | D  | D  | X  | U  |
| 29 | D | D | D | D | D | D | D | D | D | D  | D  | X  | X  | U  |
| 30 | D | D | D | D | D | D | D | D | D | D  | X  | X  | X  | U  |
| 31 | D | D | D | D | D | D | D | D | D | D  | D  | X  | U  | U  |
| 32 | D | D | D | D | D | D | D | D | D | D  | X  | X  | U  | U  |
| 33 | D | D | D | D | D | D | D | D | D | X  | X  | X  | U  | U  |
| 34 | D | X | U | U | U | U | U | U | U | U  | U  | U  | U  | U  |
| 35 | D | D | X | U | U | U | U | U | U | U  | U  | U  | U  | U  |
| 36 | D | D | D | X | U | U | U | U | U | U  | U  | U  | U  | U  |
| 37 | D | X | X | U | U | U | U | U | U | U  | U  | U  | U  | U  |
| 38 | D | D | X | X | U | U | U | U | U | U  | U  | U  | U  | U  |
| 39 | D | D | D | X | X | U | U | U | U | U  | U  | U  | U  | U  |
| 40 | D | X | X | X | U | U | U | U | U | U  | U  | U  | U  | U  |
| 41 | D | D | X | X | X | U | U | U | U | U  | U  | U  | U  | U  |
| 42 | D | D | D | X | X | X | U | U | U | U  | U  | U  | U  | U  |
| 43 | D | D | D | D | D | D | D | D | D | X  | X  | X  | X  | U  |
| 44 | D | D | D | D | D | D | X | X | X | X  | X  | X  | U  | U  |
| 45 | D | D | D | D | D | D | X | X | U | U  | U  | U  | U  | U  |
| 46 | D | D | D | D | D | X | D | D | D | D  | D  | D  | D  | X  |
| 47 | D | D | D | D | D | X | X | D | D | D  | D  | D  | X  | X  |
| 48 | D | D | X | X | X | X | X | D | D | X  | X  | X  | X  | X  |
| 49 | D | X | X | X | X | X | D | X | X | X  | X  | X  | X  | X  |
| 50 | X | U | U | U | U | U | U | X | U | U  | U  | U  | U  | U  |
| 51 | X | X | U | U | U | U | U | X | X | U  | U  | U  | U  | U  |
| 52 | X | X | X | U | U | U | U | X | X | X  | U  | U  | U  | U  |
| 53 | X | X | X | X | U | U | U | X | X | X  | X  | U  | U  | U  |
| 54 | D | D | D | D | X | U | D | D | D | D  | D  | D  | X  | U  |
| 55 | D | D | X | U | U | U | U | D | D | X  | U  | U  | U  | U  |
| 56 | D | X | U | U | U | U | U | D | X | U  | U  | U  | U  | U  |
| 57 | D | D | D | D | X | X | U | D | D | D  | D  | X  | X  | U  |
| 58 | D | D | X | X | U | U | U | D | D | X  | X  | U  | U  | U  |
| 59 | D | X | X | U | U | U | U | D | X | X  | U  | U  | U  | U  |
| 60 | D | X | X | X | X | U | U | D | X | X  | X  | X  | X  | U  |
| 61 | D | D | X | X | X | X | U | D | D | X  | X  | X  | X  | U  |
| 62-255 | | | | | | | Reserved | | | | | | | |

R1-1721702

Agreements:

Transmission direction implied by cell-specific RRC configuration cannot be overwritten by dynamic SFI to the other direction Transmission direction implied by cell-specific RRC configuration for SCell/PSCell delivered in UE-specific manner cannot be overwritten by dynamic SFI to the other direction For DCI granted multi-slot transmission (PDSCH/PUSCH/PUCCH) vs semi-static DL/UL assignment If semi-static DL/UL assignment configuration of a slot has no direction confliction with scheduled PDSCH/PUSCH/PUCCH assigned symbols, the PDSCH/PUSCH/PUCCH in that slot can be transmitted If semi-static DL/UL assignment configuration of a slot has direction confliction with scheduled PDSCH/PUSCH/PUCCH assigned symbols, the PDSCH/PUSCH/PUCCH transmission in that slot is cancelled Transmission direction implied by UE-specific RRC configuration is treated together as "measurement"

Currently already include: Measurement related signals semi-statically configured by UE-specific RRC (eg. periodic/semi-persistent CSI-RS for CSI report, periodic CSI report, periodic/semi-persistent SRS) where a DL or UL direction will be assumed This includes UE-specific RRC PRACH configuration per each BWP, type 1 grant free UL transmission, type 2 grant free UL transmission For type 2 UL transmission without grant, only the transmission at the first activated resource is treated as "UE-specific data"

FFS: Configured resources for RRM for neighbor cell measurement

Configured PDCCH monitoring under semi-static "unknown" (if not overwritten) is performed Working Assumption:

For FDD SFI support, use multi-slot SFI configuration to achieve FDD SFI support The SFI for one FDD slot is configured with 2 entries in multi-slot configuration Even slot is for DL BWP, and odd slot is for UL BWP Same mechanism can be applied to SUL case Agreements:

NR does not support the following:

Transmission of UL UE-specific data and measurement related signals not semi-statically configured by RRC is overridden by "unknown" in dynamic SFI For DCI granted multi-slot transmission (PDSCH/PUSCH/PUCCH) vs dynamic SFI, when there is no semi-static DL/UL assignment or the semi-static DL/UL assignment indicates unknown Follow scheduled multi-slot transmission

[ . . . ]

Agreements:

On the indicated effective range of the dynamic SFI, the earliest slot the SFI can be applied is the same slot FFS: The DL cancellation and UL cancellation action time Some agreements on GC-PDCCH (Group Common-Physical Downlink Control Channel) and SFI (Slot Format related Information) in the RAN1 #AH_1801 meeting are described in the Final Chairman's Note of 3GPP TSG RAN WG1 Meeting #AH_1801 (Vancouver, Canada, 22-26 Jan. 2018) as follows:

Agreements:

For SFI table

Remove entries 46, 47, 48, 49, 50, 51, 52, 53

Discuss further offline additional entries

| 46 | D | D | D | D | D | D | X | D | D | D | D | D | D | X |
|----|---|---|---|---|---|---|---|---|---|---|---|---|---|---|
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |

Agreements:

On the action time for GC-PDCCH carrying SFI,

For RRC configured DL reception cancellation, same slot cancellation is supported For RRC configured UL transmission cancellation, N2 timeline is followed Further discussion offline on the detailed conditions for DL/UL cancellation (related to the overwriting rules)

Agreements:

Explicitly add reference SCS field in UE-specific SFI table configuration

The UE does not expect the reference SCS to have larger SCS than any of the configured BWP the GC-PDCCH is configured for The reference SCS is UE-specifically configured per BWP cell (new RRC parameter)

For FR1: 15 kHz/30 kHz/60 kHz

For FR2: 60 kHz/120 kHz

[ . . . ]

Agreements: Confirm the Following Working Assumption with Updates:

For FDD SFI support, use multi-slot SFI configuration to achieve FDD SFI support RRC configures reference SCS for DL BWP and reference SCS for UL BWP (new RRC parameters)

The SFI for one FDD slot is configured with multiple values when configuring the slot format for one slot in each entry in the UE-specific SFI table If the DL and UL reference SCSs are the same, for each pair of values in the configuration for an SFI entry, even location value is for DL BWP, and odd location value is for UL BWP If DL reference SCS is higher than the UL reference SCS, K is the SCS ratio between DL reference SCS and UL reference SCS (K>1), use a (K+1) values for the SFI configuration for each reference UL slot (or K DL reference slots), with the first K values in the (K+1) values being the SFI for the K DL reference slots, and the last value for the one UL reference slot If DL reference SCS is lower than the UL reference SCS, K is the SCS ratio between UL reference SCS and DL reference SCS (K>1), use a (K+1) values for the SFI configuration for each DL reference slot (or K UL reference slots), with the first value in the (K+1) values being the SFI for the DL reference slot, and the last K values for the K UL reference slots Same mechanism can be applied to SUL case For TDD non-SUL carrier RRC configures reference SCS for non-SUL carrier and reference SCS for SUL carrier (new RRC parameter)

K is the SCS ratio between non-SUL reference SCS and SUL reference SCS (K>=1), use a (K+1) values for the SFI configuration for each SUL reference slot (or K non-SUL reference slots), with the first K values in the (K+1) values being the SFI for the K reference slots in non-SUL carrier, and the last value for the one reference slot of the SUL carrier Agreement:

UE-specific SFI table configuration (including reference SCS(s)) is per cell

Agreements:

Support XXXXXXXDDDDDDD in the slot format table (working assumption) Support DDXXXUUUDDDDDD in the slot format table Agreements:

Update the previous agreements as follows:

For DCI granted multi-slot transmission (PDSCH/PUSCH) vs semi-static DL/UL assignment If semi-static DL/UL assignment configuration of a slot has no direction conflict with scheduled PDSCH/PUSCH assigned symbols, the PDSCH/
PUSCH in that slot is received/transmitted If semi-static DL/UL assignment configuration of a
slot has direction confliction with scheduled
PDSCH/PUSCH assigned symbols, the PDSCH/
PUSCH transmission in that slot is not received/
transmitted For DCI granted multi-slot transmission (PDSCH/
PUSCH) vs dynamic SFI, when there is no semi-
static DL/UL assignment or the semi-static DL/UL
assignment indicates unknown UE is not expected to receive a dynamic SFI indi-
cating a conflicting direction from DCI grant Some agreements on GC-PDCCH (Group Common-
Physical Downlink Control Channel) and SFI (Slot Format
related Information) in the RAN1 #92 meeting are described
in the Final Chairman's Note of 3GPP TSG RAN WG1
Meeting #92 (Athens, Greece, 26 Feb.-2 Mar. 2018) as
follows:

Agreements:
Remove variable slotFormatIndicator from PDCCH-Con-
fig from 38.331
subcarrierSpacing and subcarrierSpacing2 currently in
SlotFormatCombination should be moved to SlotFor-
matCombinationsPerCell
Recommend RAN2 to change the variable name maxN-
rofAggregatedCellsPerCellGroup to maxNrofSlotFor-
matCombinationsPerCell.
Use a value of 16 for the above parameter
For parameter maxNrofSlotFormatCombinationsPerSet,
use a value of 4096
For parameter maxNrofSlotFormatsPerCombination, use
a value of 256
For parameter maxSFI-DCI-PayloadSize, use a value of
128.
For cell-specific DL/UL assignment, which has tdd-UL-
DL-ConfigurationCommon and tdd-UL-DL-Configu-
rationCommon2 as shown below,
Clarify that when tdd-UL-DL-ConfigurationCommon2
is configured, the cell specific DL/UL pattern is a
concatenation of the pattern specified in tdd-UL-DL-
ConfigurationCommon and the pattern specified in
tdd-UL-DL-ConfigurationCommon2, which is tdd-
UL-DL-ConfigurationCommon+tdd-UL-DL-Con-
figurationCommon2.
--A cell-specific TDD UL/DL configuration.
tdd-UL-DL-ConfigurationCommon TDD-UL-DL-Con-
figCommon
OPTIONAL, --Cond TDD
--A second cell-specific TDD UL/DL configuration.
tdd-UL-DL-ConfigurationCommon2 TDD-UL-DL-Con-
figCommon
OPTIONAL, --Cond TDD Agreements:
For the CSS which a DCI format 2_0 is configured to be
monitored on, the UE will only monitor the first one or
two (from SFI configuration) PDCCH candidates of the
configured aggregation level for DCI format 2_0

Agreements:
If a configured DCI format 2_0 is not received, PDCCH
monitoring is performed till the next configured DCI
format 2_0 monitoring occasion Agreements:
Restrict the combined periodicity for cell-specific DL/UL
assignment to such that 20 ms is a multiple of the
combined periodicity
[ . . . ]

Agreements:
When the cell-specific DL/UL configuration is config-
ured, no explicit offset is provided for the starting slot
of the configured period, but the first slot of each even
radio frame should be a starting slot of the configured
cell-specific DL/UL pattern Agreements:
If a configured DCI format 2_0 is not received, before the
next configured DCI format 2_0 monitoring occasion,
UE will cancel RRC configured transmission, and
assume RRC configured DL transmission is not trans-
mitted, during semi-static configured flexible symbols Some agreements on GC-PDCCH (Group Common-
Physical Downlink Control Channel) and SFI (Slot Format
related Information) in the RAN1 #92bis meeting are
described in the Final Chairman's Note of 3GPP TSG RAN
WG1 Meeting #92bis (Sanya, China, 16-20 Apr. 2018) as
follows:

Agreement:
Adopt the TP in R1-1805569 for 38.213 section 11.1
Note that it reflects the agreements reached before
RAN1 #92bis related to TDD UL/UL configurations
and SFI Agreements:
UE does not expect the reference SCS in TDD UL/DL
configuration common and common2 to be different
UE does not expect the reference SCS in cell-specific
UL/DL configuration in a cell to be larger than the SCS
of any BWP configured for the cell Agreement:
Limit the size of the UE-specific SFI table to a max total
of 512 values across all entries in Rel 15.

Proposal:
In the slot format table in T538.211, the entry 255 is
defined such that the slot format is according to the
RRC configuration
[ . . . ]

Agreement:
Regarding cancellation of RRC configured DL reception
with a DCI granted UL transmission, or the cancella-
tion of RRC configured UL transmission with a DCI
granted DL reception, the cancellation is subject to a
minimum time constraint, which follows N2 timeline Proposal:
Clarify that for the N2 for SFI or DCI based RRC
configured UL transmission cancellation, the N2 is
measured at the UE side, from the end of the OFDM
symbol carrying the SFI or DCI to the beginning of the
intended RRC configured UL transmission time.

Agreement:
After active BWP switching, the SFI received before the
BWP switching is still applicable to the new active
BWP after switching.

Agreement:
UE is not expected to monitor GC-PDCCH for SFI for a
first cell in another cell with larger SCS than the first
cell in Rel-15.
[ . . . ]

Agreements:
In UE-specific SFI table configuration, it is possible for
the length of an entry to be longer than the configured
monitoring period of the SFI
For a slot covered by multiple SFIs transmitted at different
slots, the UE does not expect to receive different slot
format indicated by different SFIs.
If UE receives different slot formats for the same slot
from different SFI, the UE behaviour is not defined.

Agreement
  In the slot format table in TS38.211, the entry 255 is defined such that when a slot format for a slot is indicated as 255, the UE does not use this information in deciding the cancellation of UE-specific RRC configured DL receptions or UE-specific RRC configured UL transmissions Agreement
  When an RRC configured UL transmission is cancelled by SFI or DCI, the UE is not expected to cancel the part of RRC configured UL transmission that is to be transmitted over the OFDM symbols within N2 OFDM symbols after the end of the OFDM symbol carrying the SFI or DCI from UE perspective.

Agreements:
  For cancellation of RRC configured transmission or reception by SFI, the cancellation is for a unit of transmission/reception if any OFDM symbol within the unit is cancelled by SFI.
    For RRC configured CSI-RS resource set, the cancellation unit is the CSI-RS resource set
    For RRC configured PDSCH and PUSCH with slot aggregation, the cancellation unit is the whole PDSCH or PUSCH within a slot
    For RRC configured PDSCH, PUCCH, and PUSCH without slot aggregation, the cancellation unit is the whole PDSCH, PUCCH, and PUSCH
    For RRC configured SRS transmission, the cancellation unit is OFDM symbol Agreements:
  For a grant based PDSCH, rate matching around RRC configured CSI-RS, if the CSI-RS is cancelled by setting SFI to "flexible" or the UE does not detect the SFI for the slot, the PDSCH still rate match around the CSI-RS RE locations.
  This may not have spec impact

[ . . . ]
Agreement:
  In 38.213 section 11.1, when PDSCH granted by DCI with CRC scrambles by C-RNTI is mentioned, add CS-RNTI, P-RNTI, SI-RNTI, RA-RNTI, and TC-RNTI to the list of RNTIs as well Agreements:
  For a UE-specific RRC configured UL transmission, if one OFDM symbol of the configured transmission falls on the semi-static DL symbol or a symbol SSB is transmitted as indicated, the UE shall cancel the transmission.
  For a UE-specific RRC configured DL reception, if one OFDM symbol of the configured reception falls on the semi-static UL symbol or a symbol PRACH is configured, the UE shall cancel the reception.

3GPP TS 38.213 V15.1.0 describes procedures about slot configuration in Section 11.1 below:
10.1 UE Procedure for Determining Physical Downlink Control Channel Assignment
[ . . . ]
If a UE is configured with one or more downlink bandwidth parts (BWPs), as described in Subclause 12, the UE can be configured with PDCCH-ConfigCommon and PDCCH-Config for each configured DL BWP on the primary cell, other than the initial active DL BWP, as described in Subclause 12.
[ . . . ]
For each DL BWP configured to a UE in a serving cell, a UE can be provided by higher layer signalling with P<3 control resource sets. For each control resource set, the UE is provided the following by higher layer parameter ControlResourceSet:
  a control resource set index p, 0≤p<12, by higher layer parameter controlResourceSetId;
  a DM-RS scrambling sequence initialization value by higher layer parameter pdcch-DMRS-ScramblingID;
  a precoder granularity for a number of REGs in the frequency domain where the UE can assume use of a same DM-RS precoder by higher layer parameter precoderGranularity;
  a number of consecutive symbols provided by higher layer parameter duration;
  a set of resource blocks provided by higher layer parameter frequencyDomainResources;
  CCE-to-REG mapping parameters provided by higher layer parameter cce-REG-MappingType;
  an antenna port quasi co-location, from a set of antenna port quasi co-locations provided by higher layer parameter TCI-StatesPDCCH, indicating quasi co-location information of the DM-RS antenna port for PDCCH reception;
  an indication for a presence or absence of a transmission configuration indication (TCI) field for DCI format 1_0 or DCI format 1_1 transmitted by a PDCCH in control resource set p, by higher layer parameter TCI-PresentInDCI.
[ . . . ]
If a UE has received higher layer parameter TCI-StatesPDCCH containing a single TCI state, the UE assumes that the DM-RS antenna port associated with PDCCH reception is quasi co-located with the one or more DL RS configured by the TCI state.
  For each DL BWP configured to a UE in a serving cell, the UE is provided by higher layers with S≤10 search space sets where, for each search space set from the S search space sets, the UE is provided the following by higher layer parameter SearchSpace:—a search space set index s, 0≤s≤40, by higher layer parameter searchSpaceId;
  an association between the search space set s and a control resource set p by higher layer parameter controlResourceSetId;
  a PDCCH monitoring periodicity of $k_{p,s}$ slots and a PDCCH monitoring offset of $o_{p,s}$ slots, by higher layer parameter monitoringSlotPeriodicityAndOffset;
  a PDCCH monitoring pattern within a slot, indicating first symbol(s) of the control resource set within a slot for PDCCH monitoring, by higher layer parameter monitoringSymbolsWithinSlot;
  a number of PDCCH candidates $M_{p,s}^{(L)}$ per CCE aggregation level L by higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;
  an indication that search space set s is either a common search space set or a UE-specific search space set by higher layer parameter searchSpaceType;
  if search space set s is a common search space set,
    an indication by higher layer parameter dci-Format0-0-AndFormat1-0 to monitor PDCCH candidates for DCI format 0_0 and DCI format 1_0 with CRC scrambled by a C-RNTI or a CS-RNTI (if configured), SP-CSI-RNTI (if configured), RA-RNTI, TC-RNTI, P-RNTI, SI-RNTI;

an indication by higher layer parameter dci-Format2-0 to monitor one or two PDCCH candidates for DCI format 2_0 and a corresponding CCE aggregation level;

an indication by higher layer parameter dci-Format2-1 to monitor PDCCH candidates for DCI format 2_1;

an indication by higher layer parameter dci-Format2-2 to monitor PDCCH candidates for DCI format 2_2;

an indication by higher layer parameter dci-Format2-3 to monitor PDCCH candidates for DCI format 2_3;

if search space set s is a UE-specific search space set, an indication by higher layer parameter dci-Formats to monitor PDCCH candidates either for DCI format 0_0 and DCI format 1_0, or for DCI format 0_1 and DCI format 1_1.

If the higher layer parameter monitoringSymbolsWithinSlot indicates to a UE only one PDCCH monitoring occasion within a slot, the UE does not expect to be configured a corresponding search space set s for a PDCCH subcarrier spacing other than 15 kHz if the control resource set p associated with the search space s includes at least one symbol after the third slot symbol.

A UE does not expect to be provided a first symbol and a number of consecutive symbols for a control resource set that results in a PDCCH candidate mapping to symbols of different slots.

For a subcarrier spacing of 15 KHz, if the higher layer parameter monitoringSymbolsWithinSlot for a search space set s indicates to the UE only one PDCCH monitoring occasion in a slot for a corresponding control resource set p and the control resource set p includes at least one symbol after the third slot symbol, the UE expects that all PDCCH monitoring occasions configured to the UE are located within at most three same consecutive symbols in the slot.

A UE determines a PDCCH monitoring occasion from the PDCCH monitoring periodicity, the PDCCH monitoring offset, and the PDCCH monitoring pattern within a slot. For search space set s in control resource set p, the UE determines that a PDCCH monitoring occasion(s) exists in a slot with number $n_{s,f}^{\mu}$ [4, TS 38.211] in a frame with number $n_f$ if $(n_f \cdot N_{slot}^{frame,\mu} + n_{s,f}^{\mu} - o_{p,s}) \bmod k_{p,s} = 0$.

A PDCCH UE-specific search space $S_{k_{p,s}}^{(L)}$ at CCE aggregation level $L \in \{1, 2, 4, 8, 16\}$ is defined by a set of PDCCH candidates for CCE aggregation level L.

[ . . . ]

A UE configured with a bandwidth part indicator in DCI formats 0_1 or 1_1 determines, in case of an active DL BWP or of an active UL BWP change, the DCI information applicable to the new active DL BWP or UL BWP, respectively, as described in Subclause 12.

[ . . . ]

11.1 Slot Configuration

A slot format includes downlink symbols, uplink symbols, and flexible symbols.

For each serving cell

If a UE is provided higher layer parameter tdd-UL-DL-ConfigurationCommon and the UE is not provided higher layer parameter tdd-UL-DL-ConfigurationCommon2, the UE sets the slot format per slot over a number of slots as indicated by higher layer parameter tdd-UL-DL-Configuration Common.

The higher layer parameter tdd-UL-DL-Configuration-Common provides

A reference subcarrier spacing $\mu_{ref}$ by higher layer parameter referenceSubcarrierSpacing A slot configuration period of P msec by higher layer parameter dl-UL-TransmissionPeriodicity A number of slots $d_{slots}$ with only downlink symbols by higher layer parameter nrofDownlinkSlots A number of downlink symbols $d_{sym}$ by higher layer parameter nrofDownlinkSymbols A number of slots $u_{slots}$ with only uplink symbols by higher layer parameter nrofUplinkSlots A number of uplink symbols $u_{sym}$ by higher layer parameter nrofUplinkSymbols A value P=0.625 msec is valid only for $\mu_{ref}=3$. A value P=1.25 msec is valid only for $\mu_{ref}=2$ or $\mu_{ref}=3$. A value P=2.5 msec is valid only for $\mu_{ref}=1$, or $\mu_{ref}=2$, or $\mu_{ref}=3$.

A slot configuration period of P msec includes $s = P \cdot 2^{\mu_{ref}}$ slots with $\mu_{ref}$ subcarrier spacing. From the S slots, a first $d_{slots}$ slots include only downlink symbols and a last $u_{slots}$ slots include only uplink symbols. The $d_{sym}$ symbols after the first $d_{slots}$ slots are downlink symbols. The $u_{sym}$ symbols before the last $u_{slots}$ slots are uplink symbols. The remaining $(S - d_{slots} - u_{slots}) \cdot N_{symb}^{slot} - d_{sym} - u_{sym}$ are flexible symbols.

The first symbol every 20/P periods is a first symbol in an even frame.

A UE expects that the reference subcarrier spacing $\mu_{ref}$ is smaller than or equal to the subcarrier spacing $\mu$ for any of the configured DL BWP or UL BWP.

A format for a slot with extended CP is determined from a format for a slot with normal CP. A UE determines an extended CP symbol as downlink/uplink/flexible symbol if the overlapping normal CP symbols that are downlink/uplink/flexible symbols, respectively. A UE determines an extended CP symbol as flexible symbol if one of the overlapping normal CP symbols is flexible.

If the UE is provided higher layer parameters tdd-UL-DL-ConfigurationCommon and tdd-UL-DL-ConfigurationCommon2, the UE sets the slot format per slot over a first number of slots as indicated by higher layer parameter tdd-UL-DL-ConfigurationCommon and the UE sets the slot format per slot over a second number of slots as indicated by tdd-UL-DL-ConfigurationCommon2.

The higher layer parameter tdd-UL-DL-ConfigurationCommon2 provides

A reference subcarrier spacing $\mu_{ref,2}$ by higher layer parameter referenceSubcarrierSpacing;

A slot configuration period of $P_2$ msec by higher layer parameter dl-UL-TransmissionPeriodicity;

A number of slots $d_{slots,2}$ with only downlink symbols by higher layer parameter nrofDownlinkSlots;

A number of downlink symbols $d_{sym,2}$ by higher layer parameter nrofDownlinkSymbols;

A number of slots $u_{slots,2}$ with only uplink symbols by higher layer parameter nrofUplinkSlots;

A number of uplink symbols $u_{sym,2}$ by higher layer parameter nrofUplinkSymbols.

A UE expects $\mu_{ref,2} = \mu_{ref}$.

A value $P_2=0.625$ msec is valid only for $\mu_{ref,2}=3$. A value $P_2=1.25$ msec is valid only for $\mu_{ref,2}=2$ or $\mu_{ref,2}=3$. A value $P_2=2.5$ msec is valid only for $\mu_{ref,2}=1$, or $\mu_{ref,2}=2$, or $\mu_{ref,2}=3$.

A slot configuration period of $P+P_2$ slots includes first $S = P \cdot 2^{\mu_{ref}}$ slots and second $S_2 = P_2 \cdot 2^{\mu_{ref}}$ slots. From the $S_2$ slots, a first $d_{slots,2}$ slots include only downlink symbols and a last $u_{slots,2}$ include only uplink symbols. The $d_{sym,2}$ symbols after the first $d_{slots,2}$ slots are downlink symbols. The $u_{sym,2}$ symbols before the last $u_{slots,2}$ slots are uplink symbols. The remaining $(S_2 - d_{slots,2} - u_{slots,2}) \cdot N_{symb}^{slot} - d_{sym,2} - u_{sym,2}$ are flexible symbols.

A UE expects that $P+P_2$ divides 20 msec.

The first symbol every $20/(P+P_2)$ periods is a first symbol in an even frame.

If the UE is additionally provided higher layer parameter tdd-UL-DL-ConfigDedicated, the parameter tdd-UL-DL-ConfigDedicated overrides only flexible symbols per slot over the number of slots as provided by tdd-UL-DL-ConfigurationCommon or tdd-UL-DL-ConfigurationCommon2. The higher layer parameter tdd-UL-DL-ConfigDedicated provides A set of slot configurations by higher layer parameter slotSpecificConfigurationsToAddModList;

For each slot configuration from the set of slot configurations
- A slot index for a slot provided by higher layer parameter slotIndex;
- A set of symbols for a slot by higher layer parameter symbols where if symbols=allDownlink, all symbols in the slot are downlink;
  if symbols=allUplink, all symbols in the slot are uplink;
  if symbols=explicit and higher layer parameter nrofDownlinkSymbols provides a number of downlink first symbols in the slot and higher layer parameter nrofUplinkSymbols provides a number of uplink last symbols in the slot. If nrofDownlinkSymbols is not provided, there are no downlink first symbols in the slot and if nrofUplinkSymbols is not provided, there are no uplink last symbols in the slot. The remaining symbols in the slot are flexible.

For each slot having a corresponding index provided by higher layer parameter slotIndex, the UE applies a format provided by the corresponding higher layer parameter symbols. The UE does not expect tdd-UL-DL-ConfigDedicated to indicate as uplink or as downlink a symbol that tdd-UL-DL-ConfigurationCommon or, when provided, tdd-UL-DL-ConfigurationCommon2 indicates as a downlink or as an uplink symbol, respectively.

For each slot configuration provided by tdd-UL-DL-ConfigDedicated, a reference subcarrier spacing is the reference subcarrier spacing $\mu_{ref}$ provided by tdd-UL-DL-ConfigurationCommon.

A slot configuration period and a number of downlink symbols, uplink symbols, and flexible symbols in each slot of the slot configuration period are determined from higher layer parameters tdd-UL-DL-ConfigurationCommon, tdd-UL-DL-ConfigurationCommon2 and tdd-UL-DL-ConfigDedicated and are common to each configured BWP.

If a UE is not configured to monitor PDCCH for DCI format 2_0, the UE considers symbols in a slot indicated as downlink by higher layer parameters tdd-UL-DL-ConfigurationCommon, tdd-UL-DL-ConfigurationCommon2, or tdd-UL-DL-ConfigDedicated to be available for receptions and considers symbols in a slot indicated as uplink by higher layer parameters tdd-UL-DL-ConfigurationCommon, tdd-UL-DL-ConfigurationCommon2, or by tdd-UL-DL-ConfigDedicated to be available for transmissions.

For a set of symbols of a slot that are indicated as flexible by higher layer parameters tdd-UL-DL-Configuration Common, tdd-UL-DL-ConfigurationCommon2, or UL-DL-configuration-dedicated, when provided to a UE, or when tdd-UL-DL-ConfigurationCommon, tdd-UL-DL-ConfigurationCommon2, and UL-DL-configuration-dedicated are not provided to the UE The UE receives PDSCH or CSI-RS in the set of symbols of the slot if the UE receives a corresponding indication by a DCI format 1_0 or a DCI format 1_1.

The UE transmits PUSCH, PUCCH, PRACH, or SRS in the set of symbols of the slot if the UE receives a corresponding indication by a DCI format 0_0, DCI format 0_1, or DCI format 2_3.

If the UE is configured by higher layers to receive a PDCCH, or a PDSCH, or a CSI-RS in the set of symbols of the slot, the UE receives the PDCCH, the PDSCH, or the CSI-RS if
- the UE does not detect a DCI format 0_0, or DCI format 0_1, or DCI format 2_3 that indicates to the UE to transmit a PUSCH, a PUCCH, a PRACH, or a SRS in the set of symbols of the slot, or
- the UE detects a DCI format 0_0, or DCI format 0_1, or DCI format 2_3 that indicates to the UE to transmit a PUSCH, a PUCCH, a PRACH, or a SRS in the set of symbols of the slot and a number of symbols between a last symbol of a control resource set where the UE detects the DCI format 0_0, or DCI format 0_1, or DCI format 2_3 and a first symbol in the set of symbols is smaller than the PUSCH preparation time $N_2$ for the corresponding PUSCH timing capability [6, TS 38.214].

Otherwise, the UE does not receive the PDCCH, or the PDSCH, or the CSI-RS in the set of symbols of the slot.

If the UE is configured by higher layers to transmit a periodic SRS, or a PUCCH, or a PUSCH, or a PRACH in the set of symbols in the slot, the UE transmits the periodic SRS, or the PUCCH, or the PUSCH, or the PRACH in the set of symbols of the slot if
- the UE does not detect a DCI format 10 or DCI format 11 that indicates to the UE to receive PDSCH or CSI-RS in the set of symbols in the slot, or
- the UE detects a DCI format 1_0 or DCI format 1_1 that indicates to the UE to receive PDSCH or CSI-RS in the set of symbols in the slot and a number of symbols between a last symbol of a control resource set where the UE detects the DCI format 1_0 or DCI format 1_1 and a first symbol in the set of symbols is smaller than the PUSCH preparation time $N_2$ for the corresponding PUSCH timing capability.

Otherwise, the UE does not transmit the periodic SRS, or the PUCCH, or the PUSCH, or the PRACH in the set of symbols of the slot.

For a set of symbols of a slot that are indicated to a UE as uplink by higher layer parameters tdd-UL-DL-Configuration Common, tdd-UL-DL-ConfigurationCommon2, or tdd-UL-DL-ConfigDedicated, when provided to the UE, the UE does not receive PDCCH, PDSCH, or CSI-RS in the set of symbols of the slot.

For a set of symbols of a slot that are indicated to a UE as downlink by higher layer parameters tdd-UL-DL-ConfigurationCommon, or tdd-UL-DL-ConfigurationCommon2, or tdd-UL-DL-ConfigDedicated, when provided to the UE, the UE does not transmit PUSCH, PUCCH, PRACH, or SRS in the set of symbols of the slot.

For a set of symbols of a slot that are indicated to a UE by higher layer parameter ssb-PositionsInBurst in SystemInformationBlockType1 or ssb-PositionsInBurst in ServingCellConfigCommon, when provided to the UE, for reception of SS/PBCH blocks, the UE does not transmit PUSCH, PUCCH, PRACH in the slot if a transmission would overlap with any symbol from the set of symbols and the UE does not transmit SRS in the set of symbols of the slot. The UE does not expect the set of symbols of the slot to be indicated as uplink by higher layer parameters tdd-UL-DL-Configuration Common, tdd-UL-DL-ConfigurationCommon2, or tdd-UL-DL-ConfigDedicated, when provided to the UE.

For a set of symbols of a slot indicated to a UE by higher layer parameter prach-ConfigurationIndex in RACH-ConfigCommon for PRACH transmissions, the UE does not receive PDSCH or CSI-RS in the slot if a reception would overlap with any symbol from the set of symbols. The UE does not expect the set of symbols of the slot to be indicated as downlink by higher layer parameters tdd-UL-DL-Configuration Common, tdd-UL-DL-ConfigurationCommon2, or tdd-UL-DL-ConfigDedicated.

For a set of symbols of a slot indicated to a UE by higher layer parameters pdcch-ConfigSIB1 in MasterInformationBlock for a control resource set for Type0-PDCCH common search space, the UE does not expect the set of symbols to be indicated as uplink by higher layer parameters tdd-UL-DL-Configuration Common, tdd-UL-DL-ConfigurationCommon2, or tdd-UL-DL-ConfigDedicated.

If a UE is scheduled by a DCI format 1_1 to receive PDSCH over multiple slots, and if higher layer parameters tdd-UL-DL-Configuration Common, tdd-UL-DL-ConfigurationCommon2, or tdd-UL-DL-ConfigDedicated, when provided to the UE, indicate that, for a slot from the multiple slots, at least one symbol from a set of symbols where the UE is scheduled PDSCH reception in the slot is an uplink symbol, the UE does not receive the PDSCH in the slot.

If a UE is scheduled by a DCI format 0_1 to transmit PUSCH over multiple slots, and if higher layer parameter tdd-UL-DL-Configuration Common, tdd-UL-DL-Configuration-Common2, or tdd-UL-DL-ConfigDedicated, when provided to a UE, indicates that, for a slot from the multiple slots, at least one symbol from a set of symbols where the UE is scheduled PUSCH transmission in the slot is a downlink symbol, the UE does not transmit the PUSCH in the slot.

11.1.1 UE Procedure for Determining Slot Format

This subclause applies for a serving cell that is included in a set of serving cells configured to a UE by higher layer parameters slotFormatCombToAddModList and slotFormatCombToReleaseList.

If a UE is configured by higher layers with parameter SlotFormatIndicator, the UE is provided with a SFI-RNTI by higher layer parameter sfi-RNTI and with a payload size of DCI format 2_0 by higher layer parameter dci-PayloadSize. The UE is also provided in one or more serving cells with a configuration for a search space set s and a corresponding control resource set p for monitoring $M_{p,s}^{(L_{SFI})}$ PDCCH candidates for DCI format 2_0 with a CCE aggregation level of $L_{SFI}$ CCEs as described in Subclause 10.1. The $M_{p,s}^{(L_{SFI})}$ PDCCH candidates are the first $M_{p,s}^{(L_{SFI})}$ PDCCH candidates for CCE aggregation level $L_{SFI}$ for search space set s in control resource set p.

For each serving cell in the set of serving cells, the UE can be provided:

an identity of the serving cell by higher layer parameter servingCellId a location of a SFI-index field in DCI format 2_0 by higher layer parameter positionInDCI a set of slot format combinations by higher layer parameter slotFormatCombinations, where each slot format combination in the set of slot format combinations includes one or more slot formats indicated by a respective higher layer parameter slotFormats for the slot format combination, and a mapping for the slot format combination provided by slotFormats to a corresponding SFI-index field value in DCI format 2_0 provided by higher layer parameter slotFormatCombinationId for unpaired spectrum operation, a reference subcarrier spacing $\mu_{SFI}$ by higher layer parameter subcarrierSpacing and, when a secondary UL carrier is configured for the serving cell, a reference subcarrier spacing a $\mu_{SFI,SUL}$ by higher layer parameter subcarrierSpacing2 for the secondary UL carrier for paired spectrum operation, a reference subcarrier spacing $\mu_{SFI,DL}$ for a DL BWP by higher layer parameter subcarrierSpacing and a reference subcarrier spacing $\mu_{SFI,UL}$ for an UL BWP by higher layer parameter subcarrierSpacing2

A SFI-index field value in a DCI format 2_0 indicates to a UE a slot format for each slot in a number of slots for each DL BWP or each UL BWP starting from a slot where the UE detects the DCI format 2_0. The SFI-index field includes $\log_2$(maxSFIindex) bits where maxSFIindex is the maximum value of the values provided by corresponding higher layer parameters slotFormatCombinationId. A slot format is identified by a corresponding format index as provided in Table 11.1.1-1 where 'D' denotes a downlink symbol, 'U' denotes an uplink symbol, and 'X' denotes a flexible symbol. If a PDCCH monitoring periodicity for DCI format 2_0, provided to a UE for the search space set s by higher layer parameter monitoringSlotPeriodicityAndOffset, is smaller than a duration of a slot format combination the UE obtains at a PDCCH monitoring occasion for DCI format 2_0 by a corresponding SFI-index field value, the UE expects a same format for each slot of the slot format combination that occurs at or after the next PDCCH monitoring occasions for DCI format 2_0 to be indicated by corresponding SFI-index field values. A slot format value of 255 indicates a same format for each slot of the slot format combination that occurs at or after the next PDCCH monitoring occasions for DCI format 2_0 providing the slot format value of 255.

A UE does not expect to be configured to monitor PDCCH for DCI format 2_0 on a second serving cell that uses larger subcarrier spacing than the serving cell.

[Table 11.1.1-1 of 3GPP TS 38.213 V15.1.0, Entitled "Slot Formats for Normal Cyclic Prefix", is Reproduced as FIGS. 5A and 5B]

For unpaired spectrum operation for a UE on a serving cell, the UE is provided by higher layer parameter subcarrierSpacing a reference subcarrier spacing configuration of $\mu_{SFI}$ for each slot format in a combination of slot formats indicated by a SFI-index field value in DCI format 2_0. The UE expects that for reference subcarrier spacing configuration of $\mu_{SFI}$ and for an active DL BWP and UL BWP pair with subcarrier spacing configuration of $\mu$, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP and UL BWP pair where the first slot starts at a same time as a first slot for the reference subcarrier spacing configuration of $\mu_{SFI}$ and each downlink or flexible or uplink symbol for the reference subcarrier spacing configuration of $\mu_{SFI}$ corresponds to $2^{(\mu-\mu_{SFI})}$ consecutive downlink or flexible or uplink symbols for the subcarrier spacing configuration $\mu$.

For paired spectrum operation for a UE on a serving cell, the SFI-index field in DCI format 2_0 indicates a combination of slot formats that includes a combination of slot formats for a reference DL BWP and a combination of slot formats for a reference UL BWP of the serving cell. The UE is provided by higher layer parameter subcarrierSpacing a reference subcarrier spacing configuration of $\mu_{SFI,DL}$ for the combination of slot formats indicated by the SFI-index field value in DCI format 2_0 for the reference DL BWP of the serving cell. The UE is provided by higher layer parameter subcarrierSpacing2 a reference subcarrier spacing configuration of $\mu_{SFI,UL}$ for the combination of slot formats indicated by the SFI-index field value in DCI format 2_0 for the reference UL BWP of the serving cell. If $\mu_{SFI,DL} \geq \mu_{SFI,UL}$ and for each $2^{(\mu_{SFI,DL}-\mu_{SFI,UL})}+1$ values provided by a value of higher layer parameter slotFormats, where the value of slotFormats is determined by a value of slotFormatCombinationId in slotFormatCombination and the value of slotFormatCombinationId is set by the value of the SFI-index field value in DCI format 2_0, the first $2^{(\mu_{SFI,DL}-\mu_{SFI,UL})}$ values for the combination of slot formats are applicable to the reference DL BWP and the next value is applicable to the reference UL BWP. If $\mu_{SFI,DL} < \mu_{SFI,UL}$ and for each $2^{(\mu_{SFI,UL}-\mu_{SFI,DL})}+1$ values provided by higher layer parameter slotFormats, the first value for the combination of slot formats is applicable to the reference DL BWP and the next $2^{(\mu_{SFI,UL}-\mu_{SFI,DL})}$ values are applicable to the reference UL BWP.

The UE is provided with a reference subcarrier spacing configuration of $\mu_{SFI,DL}$ so that for an active DL BWP with subcarrier spacing configuration of $\mu_{DL}$, it is $\mu_{DL} \geq \mu_{SFI,DL}$. The UE is provided with a reference subcarrier spacing configuration of $\mu_{SFI,UL}$ so that for an active UL BWP with subcarrier spacing configuration of $\mu_{UL}$, it is $\mu_{UL} \geq \mu_{SFI,UL}$. Each slot format for a combination of slot formats indicated by the SFI-index field value in DCI format 2_0 for the reference DL BWP, by indicating a value for slotFormatCombinationId that is mapped to a value of slotFormats in slotFormatCombination, is applicable to $2^{(\mu_{DL}-\mu_{SFI,DL})}$ consecutive slots for the active DL BWP where the first slot starts at a same time as a first slot in the reference DL BWP and each downlink or flexible symbol for the reference subcarrier spacing configuration of $\mu_{SFI,DL}$ corresponds to $2^{(\mu_{DL}-\mu_{SFI,DL})}$ consecutive downlink or flexible symbols for the subcarrier spacing configuration $\mu_{DL}$. Each slot format for the combination of slot formats for the reference UL BWP is applicable to $2^{(\mu_{UL}-\mu_{SFI,UL})}$ consecutive slots for the active UL BWP where the first slot starts at a same time as a first slot in the reference UL BWP and each uplink or flexible symbol for the reference subcarrier spacing configuration of $\mu_{SFI,UL}$ corresponds to $2^{(\mu_{UL}-\mu_{SFI,UL})}$ consecutive uplink or flexible symbols for the subcarrier spacing configuration $\mu_{UL}$.

For unpaired spectrum operation with a second UL carrier for a UE on a serving cell, the SFI-index field value in DCI format 2_0 indicates a combination of slot formats that includes a combination of slot formats for a reference first UL carrier of the serving cell and a combination of slot formats for a reference second UL carrier of the serving cell. The UE is provided by higher layer parameter subcarrierSpacing a reference subcarrier spacing configuration of $\mu_{SFI}$ for the combination of slot formats indicated by the SFI-index field in DCI format 2_0 for the reference first UL carrier of the serving cell. The UE is provided by higher layer parameter subcarrierSpacing2 a reference subcarrier spacing configuration of $\mu_{SFI,SUL}$ for the combination of slot formats indicated by the SFI-index field value in DCI format 2_0 for the reference second UL carrier of the serving cell. For each $2^{(\mu_{SFI}-\mu_{SFI,SUL})}+1$ values of higher layer parameter slotFormats, the first $2^{(\mu_{SFI}-\mu_{SFI,SUL})}$ values for the combination of slot formats are applicable to the reference first UL carrier and the next value is applicable to the reference second UL carrier.

The UE expects to be provided with a reference subcarrier spacing configuration of $\mu_{SFI,SUL}$ so that for an active UL BWP in the second UL carrier with subcarrier spacing configuration of $\mu_{SUL}$, it is $\mu_{SUL} \geq \mu_{SFI,SUL}$. Each slot format for a combination of slot formats indicated by the SFI-index field in DCI format 2_0 for the reference first UL carrier is applicable to $2^{(\mu-\mu_{SFI})}$ consecutive slots for the active DL BWP and UL BWP pair in the first UL carrier where the first slot starts at a same time as a first slot in the reference first UL carrier. Each slot format for the combination of slot formats for the reference second UL carrier is applicable to $2^{(\mu_{SUL}-\mu_{SFI,SUL})}$ consecutive slots for the active UL BWP in the second UL carrier where the first slot starts at a same time as a first slot in the reference second UL carrier.

If a BWP in the serving cell is configured with $\mu=2$ and with extended CP, the UE expects $\mu_{SFI}=1$, or $\mu_{SFI}=2$, or $\mu_{SFI}=3$. A format for a slot with extended CP is determined from a format for a slot with normal CP. A UE determines an extended CP symbol as downlink/uplink/flexible symbol if the overlapping normal CP symbols that are downlink/uplink/flexible symbols, respectively. A UE determines an extended CP symbol as flexible symbol if one of the overlapping normal CP symbols is flexible.

A reference subcarrier spacing configurations of $\mu_{SFI}$, or $\mu_{SFI,DL}$, or $\mu_{SFI,UL}$, or $\mu_{SFI,SUL}$ is either 0, or 1, or 2 for frequency range 1 and is either 2 or 3 for frequency range 2.

[ . . . ]

For a set of symbols of a slot that are indicated as downlink/uplink by higher layer parameters tdd-UL-DL-Configuration Common, tdd-UL-DL-ConfigurationCommon2, or tdd-UL-DL-ConfigDedicated, when provided to a UE, the UE does not expect to detect a DCI format 2_0 with an SFI-index field value indicating the set of symbols of the slot as uplink/downlink, respectively, or as flexible.

[ . . . ]

12 Bandwidth Part Operation

[ . . . ]

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink and a set of at most four BWPs for transmissions by the UE (UL BWP set) in an UL bandwidth by parameter BWP-Uplink for the serving cell.

[ . . . ]

If a UE has dedicated BWP configuration, the UE can be provided by higher layer parameter firstActiveDownlinkBWP-Id a first active DL BWP for receptions and by higher layer parameter firstActiveUplinkBWP-Id a first active UL BWP for transmissions on the primary cell.

For each DL BWP or UL BWP in a set of DL BWPs or UL BWPs, respectively, the UE is configured the following parameters for the serving cell as defined in [4, TS 38.211] or [6, TS 38.214]:

- a subcarrier spacing provided by higher layer parameter subcarrierSpacing
- a cyclic prefix provided by higher layer parameter cyclicPrefix
- a first PRB and a number of contiguous PRBs indicated by higher layer parameter locationAndBandwidth that is interpreted as RIV according to [4, TS 38.214], setting $N_{BWP}^{size}=275$, and the first PRB is a PRB offset relative to the PRB indicated by higher layer parameters offsetToCarrier and subcarrierSpacing;
- an index in the set of DL BWPs or UL BWPs by respective higher layer parameter bwp-Id
- a set of BWP-common and a set of BWP-dedicated parameters by higher layer parameters bwp-Common and bwp-Dedicated [12, TS 38.331]

For unpaired spectrum operation, a DL BWP from the set of configured DL BWPs with index provided by higher layer parameter bwp-Id for the DL BWP is paired with an UL BWP from the set of configured UL BWPs with index provided by higher layer parameter bwp-Id for the UL BWP when the DL BWP index and the UL BWP index are equal.

For unpaired spectrum operation, a UE does not expect to receive a configuration where the center frequency for a DL BWP is different than the center frequency for an UL BWP when the bwp-Id of the DL BWP is equal to the bwp-Id of the UL BWP.

For each DL BWP in a set of DL BWPs on the primary cell, a UE can be configured control resource sets for every type of common search space and for UE-specific search space as described in Subclause 10.1. The UE does not expect to be configured without a common search space on the PCell, or on the PSCell, in the active DL BWP.

For each UL BWP in a set of UL BWPs, the UE is configured resource sets for PUCCH transmissions as described in Subclause 9.2.

A UE receives PDCCH and PDSCH in a DL BWP according to a configured subcarrier spacing and CP length for the DL BWP. A UE transmits PUCCH and PUSCH in an UL BWP according to a configured subcarrier spacing and CP length for the UL BWP.

If a bandwidth part indicator field is configured in DCI format 1_1, the bandwidth part indicator field value indicates the active DL BWP, from the configured DL BWP set, for DL receptions. If a bandwidth part indicator field is configured in DCI format 0_1, the bandwidth part indicator field value indicates the active UL BWP, from the configured UL BWP set, for UL transmissions.

If a bandwidth part indicator field is configured in DCI format 0_1 or DCI format 1_1 and indicates an UL BWP or a DL BWP different from the active UL BWP or DL BWP, respectively, the UE shall
- for each information field in the received DCI format 0_1 or DCI format 1_1
- if the size of the information field is smaller than the one required for the DCI format 0_1 or DCI format 1_1 interpretation for the UL BWP or DL BWP that is indicated by the bandwidth part indicator, respectively, the UE prepends zeros to the information field until its size is the one required for the interpretation of the information field for the UL BWP or DL BWP prior to interpreting the DCI format 0_1 or DCI format 1_1 information fields, respectively;
- if the size of the information field is larger than the one required for the DCI format 0_1 or DCI format 1_1 interpretation for the UL BWP or DL BWP that is indicated by the bandwidth part indicator, respectively, the UE uses a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively;
- set the active UL BWP or DL BWP to the UL BWP or DL BWP indicated by the bandwidth part indicator in the DCI format 0_1 or DCI format 1_1, respectively.

A UE expects to detect a DCI format 0_1 indicating active UL BWP change, or a DCI format 1_1 indicating active DL BWP change, only if a corresponding PDCCH is received within the first 3 symbols of a slot.

For the primary cell, a UE can be provided by higher layer parameter defaultDownlinkBWP-Id a default DL BWP among the configured DL BWPs. If a UE is not provided a default DL BWP by higher layer parameter defaultDownlinkBWP-Id, the default DL BWP is the initial active DL BWP.

If a UE is configured for a secondary cell with higher layer parameter defaultDownlinkBWP-Id indicating a default DL BWP among the configured DL BWPs and the UE is configured with higher layer parameter bwp-InactivityTimer indicating a timer value, the UE procedures on the secondary cell are same as on the primary cell using the timer value for the secondary cell and the default DL BWP for the secondary cell.

If a UE is configured by higher layer parameter bwp-InactivityTimer a timer value for the primary cell [11, TS 38.321] and the timer is running, the UE increments the timer every interval of 1 millisecond for frequency range 1 or every 0.5 milliseconds for frequency range 2 if the UE does not detect a DCI format 1_1 for paired spectrum operation or if the UE does not detect a DCI format 1_1 or DCI format 0_1 for unpaired spectrum operation during the interval.

If a UE is configured by higher layer parameter firstActiveDownlinkBWP-Id a first active DL BWP and by higher layer parameter firstActiveUplinkBWP-Id a first active UL BWP on a secondary cell or carrier, the UE uses the indicated DL BWP and the indicated UL BWP on the secondary cell as the respective first active DL BWP and first active UL BWP on the secondary cell or carrier.

For paired spectrum operation, a UE does not expect to transmit HARQ-ACK on a PUCCH resource indicated by a DCI format 1_0 or a DCI format 1_1 if the UE changes its active UL BWP on the PCell between a time of a detection of the DCI format 10 or the DCI format 11 and a time of a corresponding HARQ-ACK transmission on the PUCCH.

1. A UE does not expect to monitor PDCCH when the UE performs RRM measurements [10, TS 38.133] over a bandwidth that is not within the active DL BWP for the UE.

3GPP TS 38.331 V15.1.0 describes some information element (IE) related to group common PDCCH and search space as shown below. The UE can be configured by monitoringSlotPeriodicityAndOffset and/or monitoringSymbolsWithinSlot in search space IE to receive group common PDCCH.

SearchSpace

The IE SearchSpace defines how/where to search for PDCCH candidates. Each search space is associated with one ControlResourceSet.

| SearchSpace information element |
|---|
| ```
-- ASN1START
-- TAG-SEARCHSPACE-START
SearchSpace ::=                    SEQUENCE {
    -- Identity of the search space. SearchSpaceId = 0 identifies the SearchSpace configured via
 PBCH (MIB) or ServingCellConfigCommon.
    -- The searchSpaceId is unique among the BWPs of a Serving Cell.
    searchSpaceId                  SearchSpaceId,
    -- The CORESET applicable for this SearchSpace.
    -- Value 0 identifies the common CORESET configured in MIB and in ServingCellConfigCommon
    -- Values 1..maxNrofControlResourceSets-1 identify CORESETs configured by dedicated
 signalling
    controlResourceSetId           ControlResourceSetId          OPTIONAL,     -- Cond SetupOnly
``` |

| SearchSpace information element |
| --- |

```
        -- Slots for PDCCH Monitoring configured as periodicity and offset. Corresponds to L1
parameters 'Montoring-periodicity-PDCCH-slot' and
        -- 'Montoring-offset-PDCCH-slot' (see 38.213, section 10)
        monitoringSlotPeriodicityAndOffset      CHOICE {
            s11                                     NULL,
            s12                                     INTEGER (0..1),
            s14                                     INTEGER (0..3),
            s15                                     INTEGER (0..4),
            s18                                     INTEGER (0..7),
            s110                                    INTEGER (0..9),
            s116                                    INTEGER (0..15),
            s120                                    INTEGER (0..19)
        }   OPTIONAL,   -- Cond Setup
        -- Symbols for PDCCH monitoring in the slots configured for PDCCH monitoring (see
monitoringSlotPeriodicityAndOffset).
        -- The most significant (left) bit represents the first OFDM in a slot. The least significant
(right) bit represents the last symbol.
        -- Corresponds to L1 parameter 'Montoring-symbols-PDCCH-within-slot' (see 38.213, section 10)
        monitoringSymbolsWithinSlot         BIT STRING (SIZE (14))   OPTIONAL,    -- Cond Setup
        -- Number of PDCCH candidates per aggregation level. Corresponds to L1 parameter
'Aggregation-level-1' to 'Aggregation-level-8'.
        -- The number of candidates and aggregation levels configured here applies to all formats
unless a particular value is specified or
        -- a format-specific value is provided (see inside searchSpaceType).
        -- (see 38.213, section 10)
        nrofCandidates                          SEQUENCE {
            aggregationLevel1                       ENUMERATED {n0, n1, n2, n3, n4, n5, n6, n8},
            aggregationLevel2                       ENUMERATED {n0, n1, n2, n3, n4, n5, n6, n8},
            aggregationLevel4                       ENUMERATED {n0, n1, n2, n3, n4, n5, n6, n8},
            aggregationLevel8                       ENUMERATED {n0, n1, n2, n3, n4, n5, n6, n8},
            aggregationLevel16                      ENUMERATED {n0, n1, n2, n3, n4, n5, n6, n8}
        }   OPTIONAL,   -- Cond Setup
        -- Indicates whether this is a common search space (present) or a UE specific search space as
well as DCI formats to monitor for.
        searchSpaceType                         CHOICE {
            -- Configures this search space as common search space (CSS) and DCI formats to monitor.
            common                                  SEQUENCE {
                -- If configured, the UE monitors the DCI formats 0_0 and 1_0 with CRC scrambled by
C-RNTI, CS-RNTI (if configured),
                -- SP-CSI-RNTI (if configured), RA-RNTI, TC-RNTI, P-RNTI, SI-RNTI
                dci-Format0-0-AndFormat1-0              SEQUENCE {
                    ...
                }       OPTIONAL,   -- Need R
                -- If configured, UE monitors the DCI format format 2_0 with CRC scrambled by SFI-
RNTI
                dci-Format2-0                           SEQUENCE {
                    -- The number of PDCCH candidates specifically for format 2-0 for the configured
aggregation level.
                    -- If an aggregation level is absent, the UE does not search for any candidates
with that aggregation level.
                    -- Corresponds to L1 parameters 'SFI-Num-PDCCH-cand' and 'SFI-Aggregation-Level'
(see 38.213, section 11.1.1).
                    nrofCandidates-SFI          SEQUENCE {
                        aggregationLevel1           ENUMERATED {n1, n2}    OPTIONAL,    -- Need R
                        aggregationLevel2           ENUMERATED {n1, n2}    OPTIONAL,    -- Need R
                        aggregationLevel4           ENUMERATED {n1, n2}    OPTIONAL,    -- Need R
                        aggregationLevel8           ENUMERATED {n1, n2}    OPTIONAL,    -- Need R
                        aggregationLevel16          ENUMERATED {n1, n2}    OPTIONAL     -- Need R
                    },
                    ...
                }       OPTIONAL,   -- Need R
                -- If configured, UE monitors the DCI format format 2_1 with CRC scrambled by INT-
RNTI
                dci-Format2-1                           SEQUENCE {
                    ...
                }           OPTIONAL,   -- Need R
                -- If configured, UE monitors the DCI format 2_2 with CRC scrambled by TPC-PUSCH-RNTI
or TPC-PUCCH-RNTI
                dci-Format2-2                               SEQUENCE {
                    ...
                }           OPTIONAL,   -- Need R
                -- If configured, UE monitors the DCI format 2_3 with CRC scrambled by TPC-SRS-RNTI
                dci-Format2-3                           SEQUENCE {
                    -- Monitoring periodicity of SRS PDCCH in number of slots for DCI format 2-3.
                    -- Corresponds to L1 parameter 'SRS-monitoring-periodicity' (see 38.212, 38.213,
section 7.3.1, 11.3)
                    monitoringPeriodicity           ENUMERATED {n1, n2, n4, n5, n8, n10, n16, n20
```

| SearchSpace information element |
|---|
| `}                    OPTIONAL,   -- Cond Setup`<br>`            -- The number of PDCCH candidates for DCI format 2-3 for the configured aggregation level.`<br>`            -- Corresponds to L1 parameter 'SRS-Num-PDCCH-cand' (see 38.212, 38.213, section 7.3.1, 11.3)`<br>`            nrofPDCCH-Candidates          ENUMERATED {n1, n2},`<br>`            ...`<br>`        }     OPTIONAL    -- Need R`<br>`    },`<br>`        -- Configures this search space as UE specific search space (USS). The UE monitors the DCI format with CRC scrambled`<br>`        -- by C-RNTI, CS-RNTI (if configured), TC-RNTI (if a certain condition is met), and SP-CSI-RNTI (if configured)`<br>`        ue-Specific                   SEQUENCE {`<br>`            -- Indicates whether the UE monitors in this USS for DCI formats 0-0 and 1-0 or for formats 0-1 and 1-1.`<br>`            dci-Formats               ENUMERATED {formats0-0-And-1-0, formats0-1-And-1-1},`<br>`            ...`<br>`        }`<br>`    }          OPTIONAL    -- Cond Setup`<br>`}`<br>`-- TAG-SEARCHSPACE-STOP`<br>`-- ASN1STOP` |

SlotFormatCombinationsPerCell
The IE SlotFormatCombinationsPerCell is used to configure
FFS

| SlotFormatCombinationsPerCell information element |
|---|
| `-- ASN1START`<br>`-- TAG-SLOTFORMATCOMBINATIONSPERCELL-START`<br>`-- The SlotFormatCombinations applicable for one serving cell. Corresponds to L1 parameter 'cell-to-SFI' (see 38.213, section 11.1.1)`<br>`SlotFormatCombinationsPerCell ::=                 SEQUENCE {`<br>`    -- The ID of the serving cell for which the slotFormatCombinations are applicable`<br>`    servingCellId                     ServCellIndex,`<br>`    -- Reference subcarrier spacing for this Slot Format Combination. Corresponds to L1 parameter 'SFI-scs' (see 38.213, section FFS_Section)`<br>`    subcarrierSpacing                 SubcarrierSpacing,`<br>`    -- Reference subcarrier spacing for a Slot Format Combination on an FDD or SUL cell.`<br>`    -- Corresponds to L1 parameter 'SFI-scs2' (see 38.213, section FFS_Section).`<br>`    -- For FDD, subcarrierSpacing (SFI-scs) is the reference SCS for DL BWP and subcarrierSpacing2 (SFI-scs2) is the reference SCS for UL BWP.`<br>`    -- For SUL, subcarrierSpacing (SFI-scs) is the reference SCS for non-SUL carrier and subcarrierSpacing2 (SFI-scs2) is the reference`<br>`    -- SCS for SUL carrier.`<br>`    subcarrierSpacing2                SubcarrierSpacing     OPTIONAL,   -- Need R`<br>`    -- A list with SlotFormatCombinations. Each SlotFormatCombination comprises of one or more SlotFormats (see 38.211, section 4.3.2)`<br>`    -- FFS_CHECK: RAN1 indicates that the combinations could be of two different types... but they don't specify the second`<br>`    slotFormatCombinations            SEQUENCE (SIZE (1..maxNrofSlotFormatCombinationsPerSet)) OF SlotFormatCombination   OPTIONAL,`<br>`    -- The (starting) position (bit) of the slotFormatCombinationId (SFI-Index) for this serving cell (servingCellId) within the DCI payload.`<br>`    -- Corresponds to L1 parameter 'SFI-values' (see 38.213, section FFS_Section)`<br>`    positionInDCI                     INTEGER(0..maxSFI-DCI-PayloadSize-1)          OPTIONAL,`<br>`    ...`<br>`}`<br>`SlotFormatCombination ::=                 SEQUENCE {`<br>`    -- This ID is used in the DCI payload to dynamically select this SlotFormatCombination.`<br>`    -- Corresponds to L1 parameter 'SFI-index' (see 38.213, section FFS_Section)`<br>`    slotFormatCombinationId                 SlotFormatCombinationId,`<br>`    -- Slot formats that occur in consecutive slots in time domain order as listed here. The the slot formats are`<br>`    -- defined in 38.211, table 4.3.2-3 and numbered with 0..255.`<br>`    slotFormats                             SEQUENCE (SIZE (1..maxNrofSlotFormatsPerCombination)) OF INTEGER (0..255)`<br>`}`<br>`-- SFI index that is assoicated with a certian slot-format-combination`<br>`-- Corresponds to L1 parameter 'SFI-index' (see 38.213, section FFS_Section)` |

-continued

| SlotFormatCombinationsPerCell information element |
|---|

```
SlotFormatCombinationId ::=                    INTEGER (0..maxNrofSlotFormatCombinationsPerSet-1)
-- TAG-SLOTFORMATCOMBINATIONSPERCELL-STOP
-- ASN1STOP
```

SlotFormatIndicator

The IE SlotFormatIndicator is used to configure monitoring a Group-Common-PDCCH for Slot-Format-Indicators (SFI).

| SlotFormatIndicator information element |
|---|

```
-- ASN1START
-- TAG-SLOTFORMATINDICATOR-START
SlotFormatIndicator ::=              SEQUENCE {
    -- RNTI used for SFI on the given cell
    -- Corresponds to L1 parameter 'SFI-RNTI' (see 38.213, section 11.1.1)
    sfi-RNTI                          RNTI-Value,
    -- Total length of the DCI payload scrambled with SFI-RNTI.
    -- Corresponds to L1 parameter 'SFI-DCI-payload-length' (see 38.213, section 11.1.1)
    dci-PayloadSize                   INTEGER (1..maxSFI-DCI-PayloadSize),
    -- A list of SlotFormatCombinations for the UE's serving cells.
    -- Corresponds to L1 parameter 'SFI-cell-to-SFI' (see 38.213, section 11.1.1)
    slotFormatCombToAddModList        SEQUENCE (SIZE(1..maxNrofAggregatedCellsPerCellGroup)) OF
SlotFormatCombinationsPerCell         OPTIONAL,     -- Need N
    slotFormatCombToReleaseList       SEQUENCE (SIZE(1..maxNrofAggregatedCellsPerCellGroup)) OF
ServCellIndex                         OPTIONAL,     -- Need N
    ...
}
-- TAG-SLOTFORMATINDICATOR-STOP
-- ASN1STOP
```

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

Beam sweeping: In order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: A necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: A serving beam for a UE is a beam generated by a network node, e.g. TRP, which is currently used to communicate with the UE, e.g. for transmission and/or reception.

Candidate beam: A candidate beam for a UE is a candidate of a serving beam. Serving beam may or may not be candidate beam.

Qualified beam: A qualified beam is a beam with radio quality, based on measuring signal on the beam, better than a threshold.

The best serving beam: The serving beam with the best quality (e.g. the highest BRSRP value).

The worst serving beam: The serving beam with the worst quality (e.g. the worst BRSRP value).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request(SR), channel state information(CSI), HARQ-ACK/NACK for downlink transmission Slot: a scheduling unit in NR. Slot duration is 14 OFDM symbols.

Mini-slot: A scheduling unit with duration less than 14 OFDM symbols.

Slot format information (SFI): Information of slot format of symbols in a slot. A symbol in a slot may belong to following type: downlink, uplink, unknown or other. The slot format of a slot could at least convey transmission direction of symbols in the slot.

DL common signal: Data channel carrying common information that targets for multiple UEs in a cell or all UEs in a cell. Examples of DL common signal could be system information, paging, RAR.

DL URLLC: A type of DL transmission which requires very high reliability and very low latency. To fulfill the latency requirement, an example is to transmit DL URLLC in a mini-slot, e.g. the data duration could be less than 1 slot such as 1~4 OFDM symbol(s) and there may be one or multiple monitoring occasions for DL URLLC control in a slot. In this example, a UE is configured with a CORESET to monitor for DL URLLC control indicating DL URLLC transmission. The CORESET can be configured on middle symbol of a slot. The DL URLLC transmission may be transmitted on the following few symbols of the CORESET.

Figure 15:
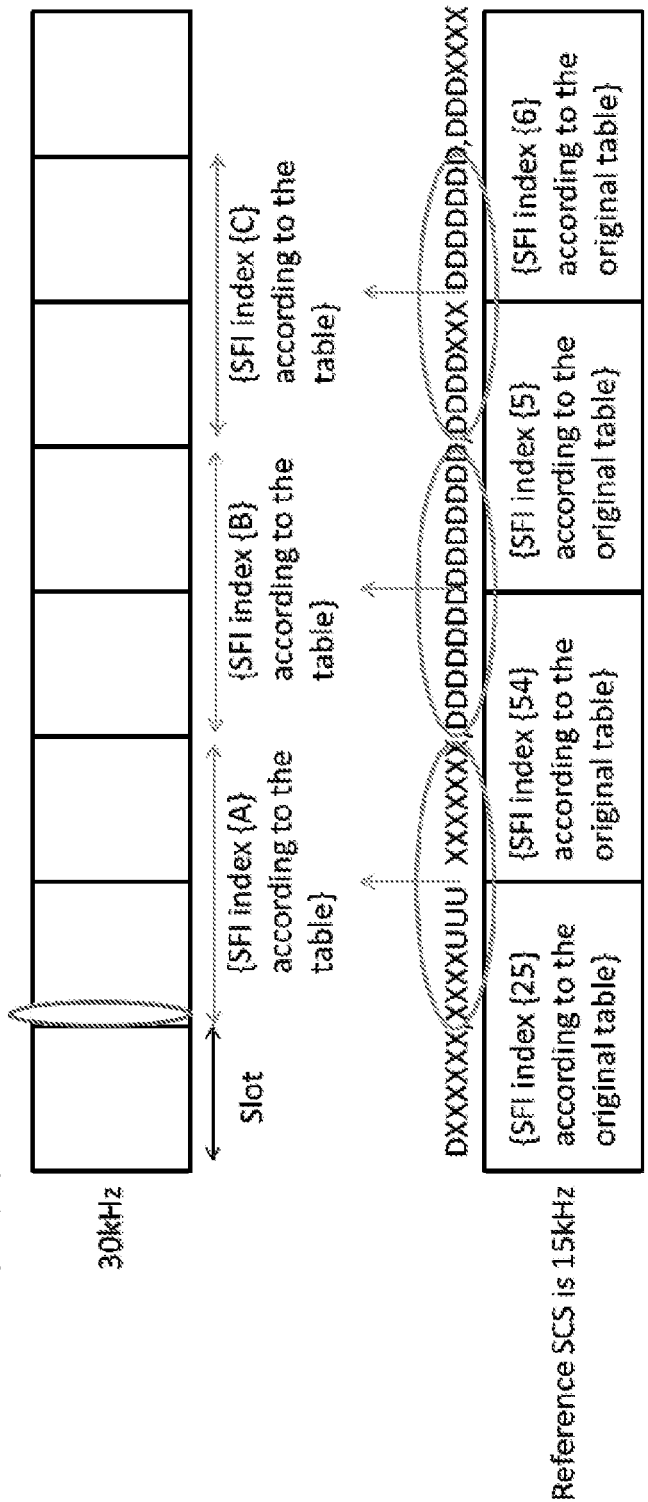
FIG. 15 is a diagram according to one exemplary embodiment.

One or multiple of following assumptions for network side may be used hereafter:
- NR using beamforming could be standalone, i.e. UE can directly camp on or connect to NR.
- NR using beamforming and NR not using beamforming could coexist, e.g. in different cells.
- TRP would apply beamforming to both data and control signaling transmissions and receptions, if possible and beneficial.
  - Number of beams generated concurrently by TRP depends on TRP capability, e.g. maximum number of beams generated concurrently by different TRPs may be different.
  - Beam sweeping is necessary, e.g. for the control signaling to be provided in every direction.
  - (For hybrid beamforming) TRP may not support all beam combinations, e.g. some beams could not be generated concurrently. FIG. 15 shows an example for combination limitation of beam generation.
- Downlink timing of TRPs in the same cell are synchronized.
- RRC layer of network side is in BS.
- TRP should support both UEs with UE beamforming and UEs without UE beamforming, e.g. due to different UE capabilities or UE releases.

Figure 10:
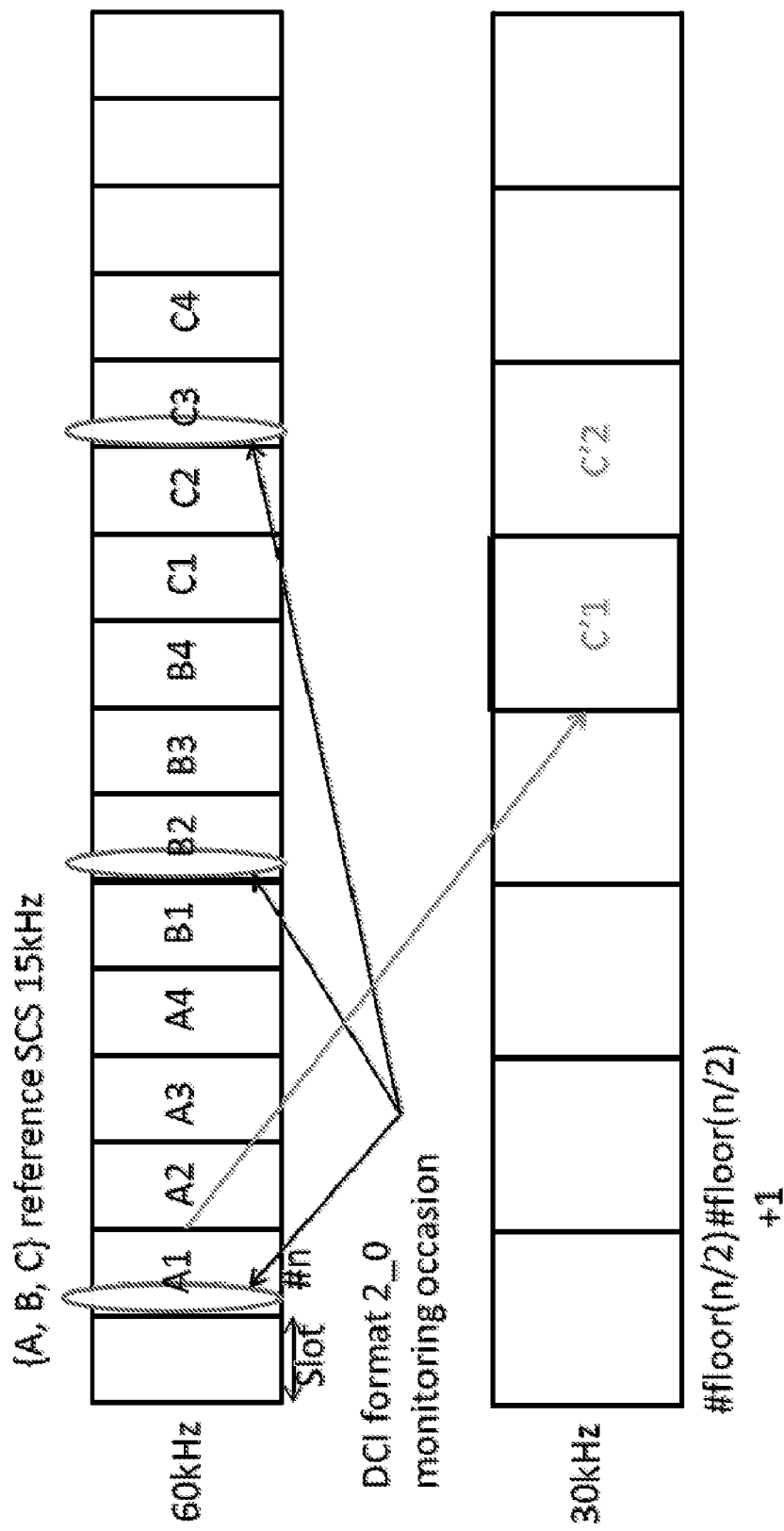
FIG. 10 is a diagram according to one exemplary embodiment.

One or multiple of following assumptions for UE side may be used hereafter:
- UE may perform beamforming for reception and/or transmission, if possible and beneficial.
  - Number of beams generated concurrently by UE depends on UE capability, e.g. generating more than one beam is possible.
  - Beam(s) generated by UE is wider than beam(s) generated by TRP, gNB, or eNB.
  - Beam sweeping for transmission and/or reception is generally not necessary for user data but may be necessary for other signaling, e.g. to perform measurement.
  - (For hybrid beamforming) UE may not support all beam combinations, e.g. some beams could not be generated concurrently. FIG. 10 shows an example of combination limitation of beam generation.
- Not every UE supports UE beamforming, e.g. due to UE capability or UE beamforming is not supported in NR first (few) release(s).
- One UE is possible to generate multiple UE beams concurrently and to be served by multiple serving beams from one or multiple TRPs of the same cell.
  - Same or different (DL or UL) data could be transmitted on the same radio resource via different beams for diversity or throughput gain.
- There are at least two UE (RRC) states: connected state (or called active state) and non-connected state (or called inactive state or idle state). Inactive state may be an additional state or belong to connected state or non-connected state.

In the RAN1 #92bis meeting, an agreement was reached that slot format indication (SFI) received before active bandwidth part (BWP) switching could be applicable to new active BWP. However, based on this agreement and the current search space configuration discussed in 3GPP TS 38.331 V15.1.0, one issue may happen when reusing SFI received in current/original BWP on new active BWP. When UE switches its active BWP to a BWP with different SCS (subcarrier spacing) from current or original active BWP, how UE applies SFI received in current/original BWP on new active BWP needs further discussed. There are two different cases in this issue: BWP switching from lower SCS BWP to higher SCS BWP and from higher SCS BWP.

Figure 6:
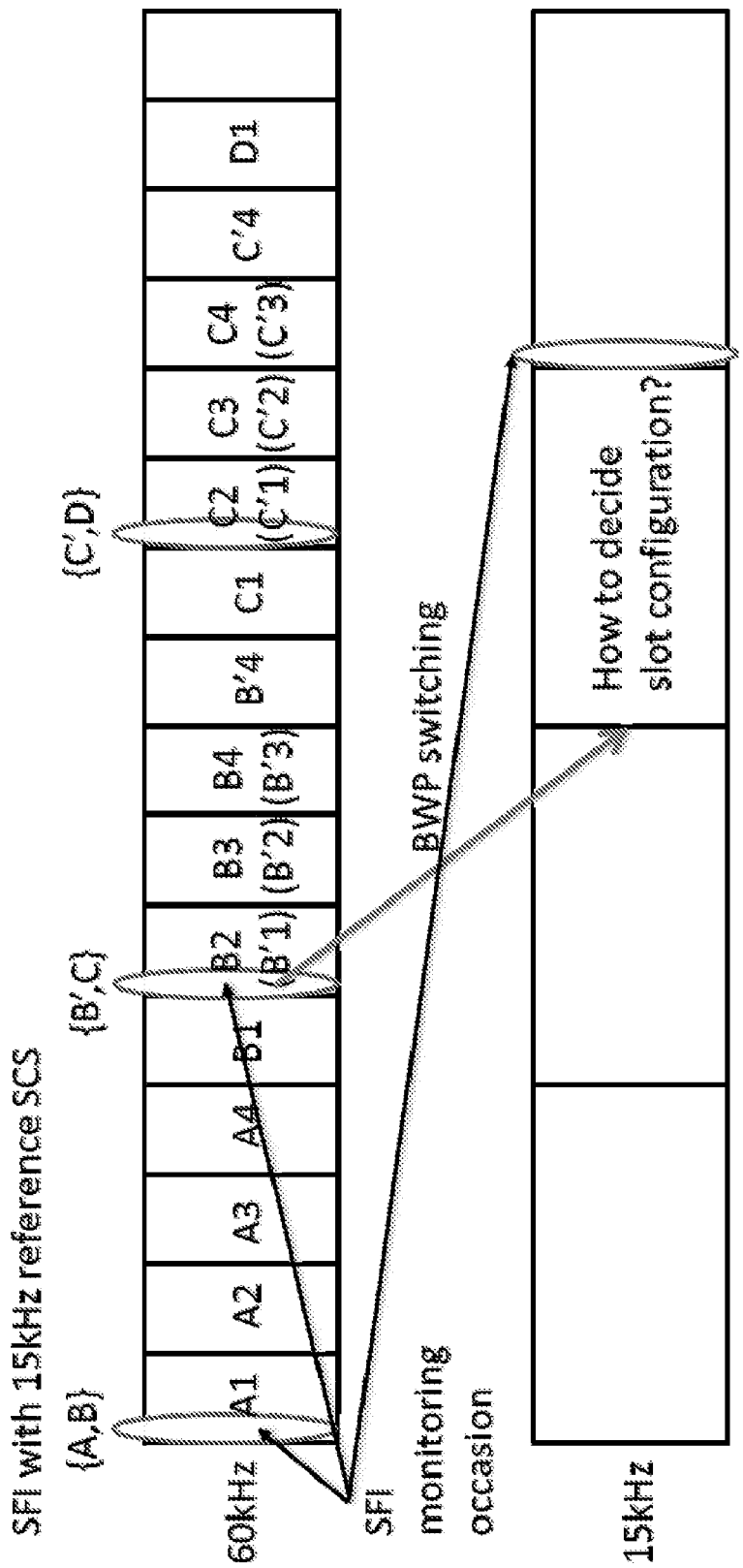
FIG. 6 is a diagram according to one embodiment.

FIG. 6 illustrates an example of the case where UE switches from a BWP with higher SCS to a BWP with lower SCS. In this example, UE is configured to receive a DCI format 2_0 in 60 kHz BWP every 5 slots and each DCI format 2_0 comprising a SFI-index field indicating 2 SFI indexes, wherein each SFI index indicates (slot format/slot configuration) for consecutive 4 slots. SFI index A in 60 kHz BWP indicates {A1, A2, A3, A4} 4 slots and so does other SFI indices. B' is a SFI index satisfying that the slot format indicated by B' i.e. {B'1}, {B2}, {B'2=B3} and {B'3}={B4} and C' is similar to B'. In this example, if UE receives a DCI in $6^{th}$ slot in 60 kHz BWP indicating a BWP index of 15 kHz BWP, UE may switch active BWP from 60 kHz BWP to 15 kHz BWP. Since $3^{rd}$ slot in 15 kHz BWP may be indicated by 4 60 kHz slots with SFI index {B'4, C1, C2, C3}, it is hard for UE to determine either SFI index {B'} or {C} for $3^{rd}$ slot in 15 kHz BWP until the next monitoring occasion for DCI format 2_0 in 15 kHz BWP.

As discussed above, CORESET(s) for monitoring GC PDCCH for dynamic SFI is located in the first 1/2/3 symbols in a slot. In other words, monitoring occasion for GC PDCCH for SFI (e.g., DCI format 2_0) is located in the first 1/2/3 symbols in a slot. According to time duration of the CORESET(s) for monitoring GC PDCCH for dynamic SFI, there could be several possible monitoring occasions in a slot. For example, a possible monitoring occasion(s) for GC PDCCH carrying dynamic SFI could be {symbol index #0}, {symbol index #1}, {symbol index #2}, {symbol index #0, #1}, {symbol index #1, #2}, or {symbol index #0, #1, #2}. In the current PHY specification (3GPP TS 38.213 V15.1.0), a UE can be configured with a reference SCS (per serving cell) for interpreting a SFI combination in a DCI format 2_0. Based on the current RRC specification (3GPP TS 38.331 V15.1.0) and PHY specification (3GPP TS 38.213 V15.1.0), if a UE is configured to receive DCI format 2_0 on a monitoring occasion which occurs not aligning the beginning of a slot with the reference SCS, it may incur some issues.

Figure 13:
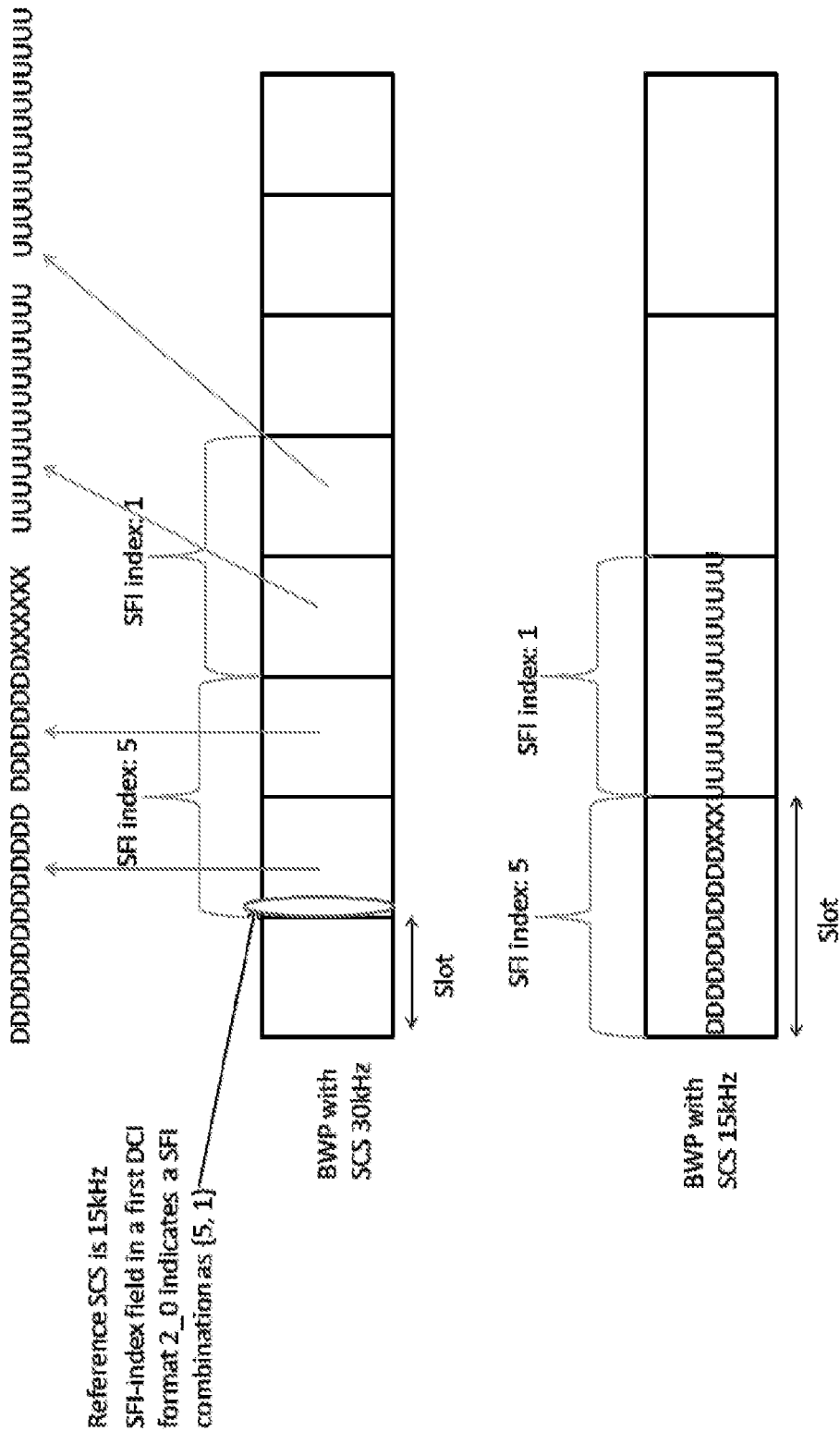
FIG. 13 is a diagram according to one exemplary embodiment.

The first issue can be illustrated in FIG. 13. Assuming UE is configured to receive DCI format 2_0 on $2^{nd}$ slot of 30 kHz BWP, wherein a SFI combination indicated by the DCI format 2_0 is assumed as {5, 1}, 15 kHz BWP and 30 kHz BWP may have conflict transmitted direction in $3^{rd}$ slot of 30 kHz BWP in a NR carrier. Based on an agreement in the RAN1 92bis meeting, it is hard for UE to reuse SFI before switching in this case due to misalignment between a slot for monitoring a DCI format 2_0 and a slot with reference SCS. From NW's aspect, it is also harmful to have conflict transmitted direction in a carrier.

Figure 14:
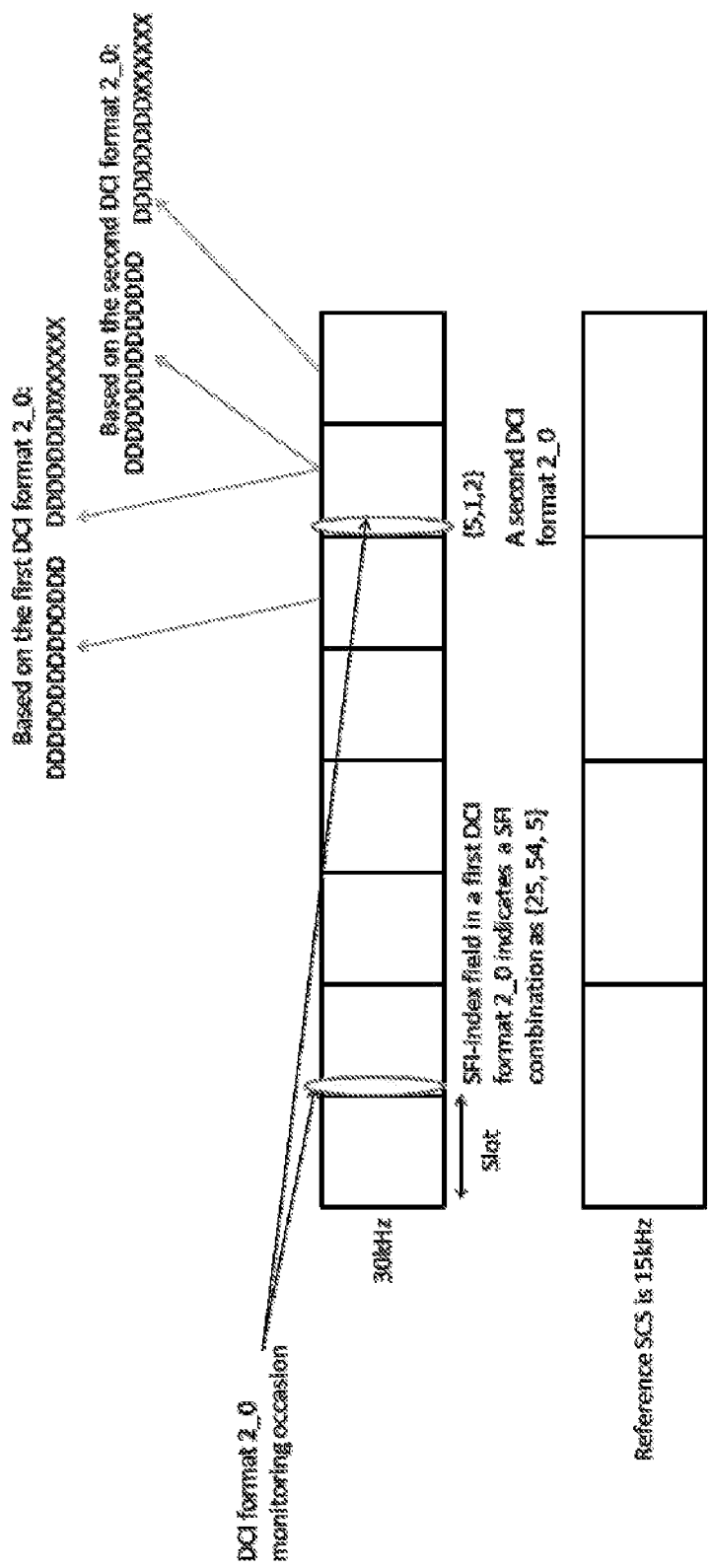
FIG. 14 is a diagram according to one exemplary embodiment.

The second issue can be illustrated in FIG. 14. Since NR has already to capture a scenario that UE is configured with a monitoring periodicity for receiving DCI format 2_0, wherein the monitoring periodicity is smaller than length of a SFI combination indicated by a DCI format 2_0, for some slots covered by indication of two DCI format 2_0, it has been agreed to keep the same slot format. However, based on a configured monitoring periodicity in FIG. 14, it may be unclear for slots covered by indication of two DCI format 2_0. In this scenario, UE expects same slot format for an overlapping slot in time domain addition. As shown in FIG. 14, if a UE is configured to receive DCI format 2_0 every 5 slots in a BWP with SCS 30 kHz and a reference SCS is assumed as 15 kHz, slot format of $7^{th}$ slot in this figure may be indicated by two DCI format 2_0. Slot format of $7^{th}$ slot is {DDDDDDDDXXXXXX} determined based on current PHY specification (3GPP TS 38.213 V15.1.0). However, it is hard for NW to transmit a DCI format 2_0 in $7^{th}$ slot to indicate the same slot format as {DDDDDDDDXXXXXX}. There is no slot format indicated by a SFI index in current slot format table in PHY specification (3GPP TS 38.213 V15.1.0). How NW indicates a slot format by a SFI index to align slot format with the reference SCS needs further discussion.

One possible embodiment is to limit the cases for applying SFI index(es) received before BWP switching on a new/target active BWP. UE may follow a rule for determining whether SFI index(es) received before BWP switching can be applied on slot(s) of the new/target active BWP or not. In one embodiment, the rule can be that if the slot configuration indicated by SFI index(es) received before BWP switching does not match the slot boundary of the new/target active BWP, UE could not apply SFI index(es) received before BWP switching on slot(s) of the new/target active BWP.

In one embodiment, the rule can be one or more following options:
1. If time duration of consecutive slot(s) indicated by an SFI index received before BWP switching can match slot boundary of the new/target active BWP, UE could apply the SFI index received before BWP switching.
2. If time duration of consecutive slot(s) indicated by an SFI index received before BWP switching does not match slot boundary of the new/target active BWP, UE could not apply the SFI index received before BWP switching.
3. If time duration of consecutive slot(s) indicated by an SFI index received before BWP switching can match slot boundary determined based on a reference subcarrier spacing, UE could apply the SFI index received before BWP switching.
4. If time duration of consecutive slot(s) indicated by an SFI index received before BWP switching does not match slot boundary determined based on a reference subcarrier spacing, UE could not apply the SFI index received before BWP switching. In one embodiment, the reference subcarrier spacing may be smaller than subcarrier spacing of current/original active BWP and/or new/target active BWP. For example, as shown in FIG. 6, if UE switches active BWP from $1^{st}$ slot of 60 kHz BWP to $2^{nd}$ slot of 15 kHz BWP in the figure, based on the rule, UE can reuse SFI index {B'} received in $1^{st}$ slot of 60 kHz BWP for $2^{nd}$ slot of 15 kHz. In another example, if UE switches active BWP from $6^{th}$ slot of 60 kHz BWP to $3^{rd}$ slot of 15 kHz BWP in the figure, based on the rule, UE cannot reuse SFI indexes {B'}, {C} received in $6^{th}$ slot of 60 kHz BWP for $3^{rd}$ slot of 15 kHz BWP.
5. If the SCS of an original/current active BWP is larger than SCS of a new/target active BWP, UE could not apply SFI index(es) received before BWP switching on slot(s) in the new/target active BWP.
6. If the SCS of an original/current active BWP is different from SCS of anew/target active BWP, UE could not apply SFI index(s) received before BWP switching on slot(s) in the new/target active BWP.

Another possible solution is UE may apply SFI index(s) received before BWP switching even if the slot configuration or slot format indicated by SFI index(s) received before BWP switching is not aligned with slot boundary of the new/target active BWP. One option is that UE may determine the slot configuration or slot format in the new/target active BWP based on slot configuration/slot format of the original/current active BWP.

In one embodiment, UE may determine slot configuration/slot format of a slot in a new/target active BWP based on a specific slot if the slot is covered by a set of slot(s) with SFI index(s) received before BWP. If a slot in the new/target active BWP comprises a set of slot(s) with different slot format/slot configuration in the original/current active BWP, UE may determine slot format/slot configuration of the slot based on a specific slot in the set of slot(s). The specific slot is one slot in the set of slot(s). For example, the specific slot could be the first slot in the set of slot(s).

Figure 7:
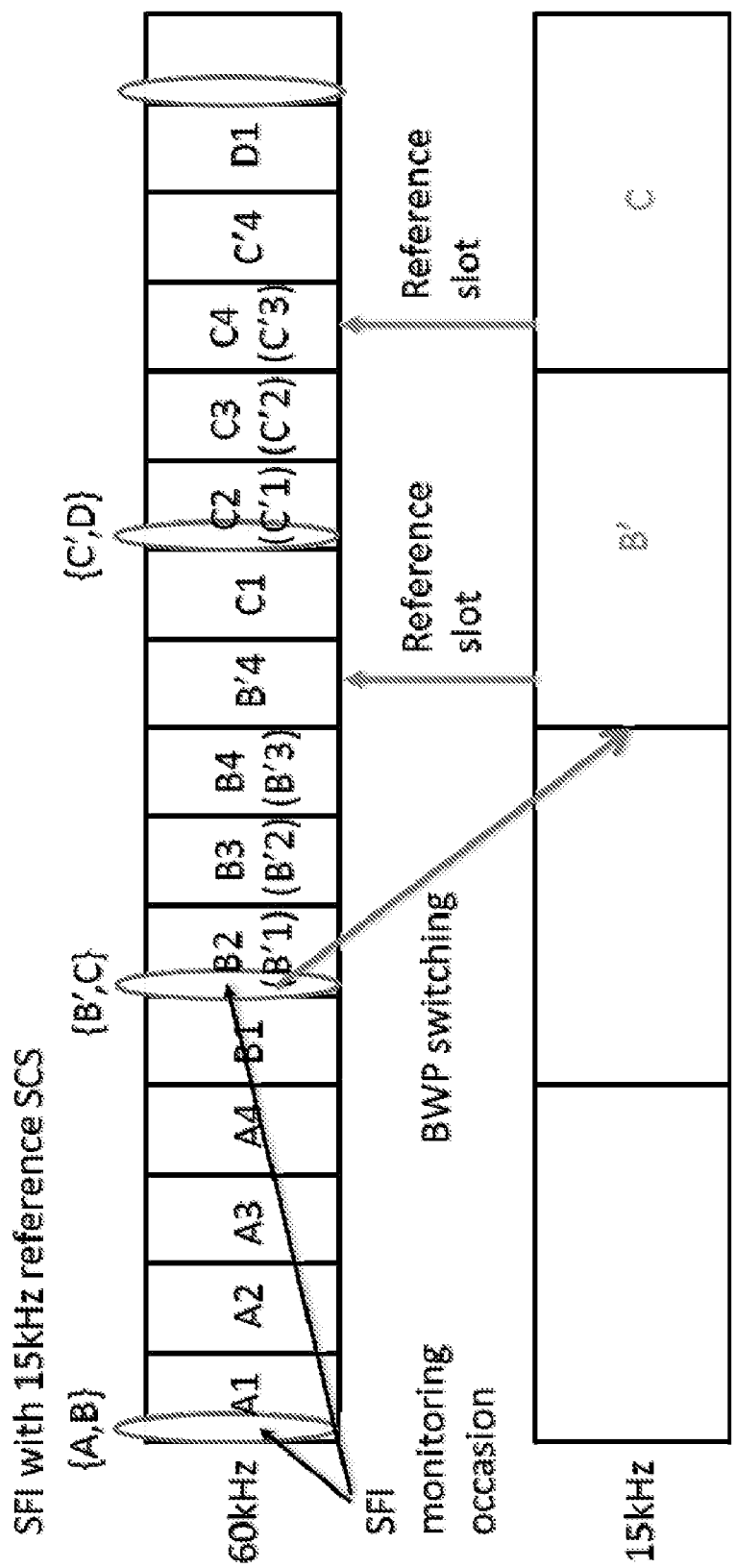
FIG. 7 is a diagram according to one embodiment.

In one embodiment, the transmitted direction of each symbol in the slot of the new/target active BWP could be indicated by slot format/slot configuration of the specific slot in the set of slot(s). FIG. 7 illustrates an example. If UE receives a DCI in $6^{th}$ slot of 60 kHz BWP indicating an BWP index of 15 kHz BWP, UE may switch active BWP from 60 kHz BWP to 15 kHz BWP. In this example, $3^{rd}$ slot of 15 kHz BWP comprises four 60 kHz slots and each slot format or slot configuration of the four 60 kHz slot is {B'4, C1, C2, C3}. UE may determine slot format or slot configuration of $3^{rd}$ slot of 15 kHz BWP as {B'} if the specific slot is the first 60 kHz slot. UE may determine slot format/slot configuration of $4^{th}$ slot of 15 kHz BWP as {C} respectively.

In one embodiment, UE could receive a DCI format 2_0 which SFI-index field indicates a SFI combination at a monitoring occasion in slot #n of the original BWP/current BWP. UE could apply the SFI combination starting from a slot in new/target BWP. The slot in the new/target BWP could be overlapped with or could comprise the slot #n of the original BWP/current BWP in time domain. In one embodiment, a SFI combination may indicate at least one SFI index. The SFI index may also indicate a slot format or slot configuration of a slot. A slot format or slot configuration could indicate transmitted direction of each symbol in a slot.

Figure 9:
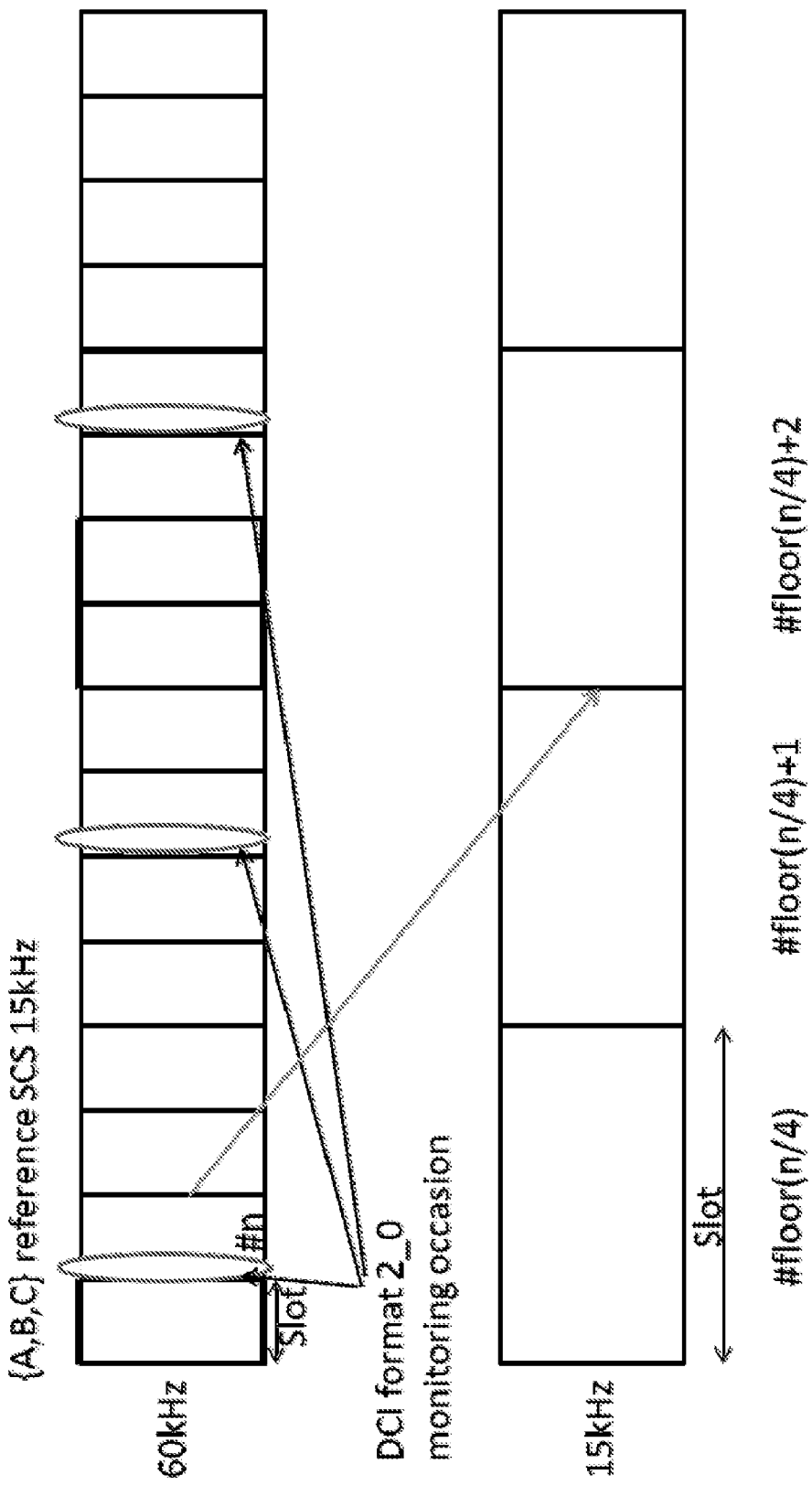
FIG. 9 is a diagram according to one exemplary embodiment.

For example, in FIG. 9, UE switches active BWP from 60 kHz BWP to 15 kHz BWP and a reference SCS is assumed as 15 kHz. In this example, if UE receives a DCI format 2_0 which SFI-index field indicates a SFI combination as {A, B, C} in slot #n, UE can determine slot configuration or slot format of slot #floor(n/4), slot #floor(n/4)+1, slot #floor(n/4)+2 of reference SCS (15 kHz). In this example, slot configuration or slot format of slot #floor(n/4) can be {A}, slot configuration or slot format of slot #floor(n/4)+1 can be {B}, and/or slot configuration or slot format of slot #floor (n/4)+1 can be {C}. In the same example, if UE switches active BWP from 3rd slot of 60 kHz BWP to $3^{rd}$ slot of 15 kHz BWP, UE determines slot format of $3^{rd}$ slot of 15 kHz as SFI index {C} in the SFI combination.

A similar example can be illustrated in FIG. 10, if UE switches active BWP from 3rd slot of 60 kHz BWP to 5th slot of 30 kHz BWP, SFI index {C} may be applied to 5th slot of 30 kHz and 6th slot of 30 kHz, which are C'1 and C'2 respectively. Each downlink or flexible or uplink symbol for the reference SCS corresponds to 2 consecutive downlinks or flexible or uplink symbols for 30 kHz SCS.

Figure 8:
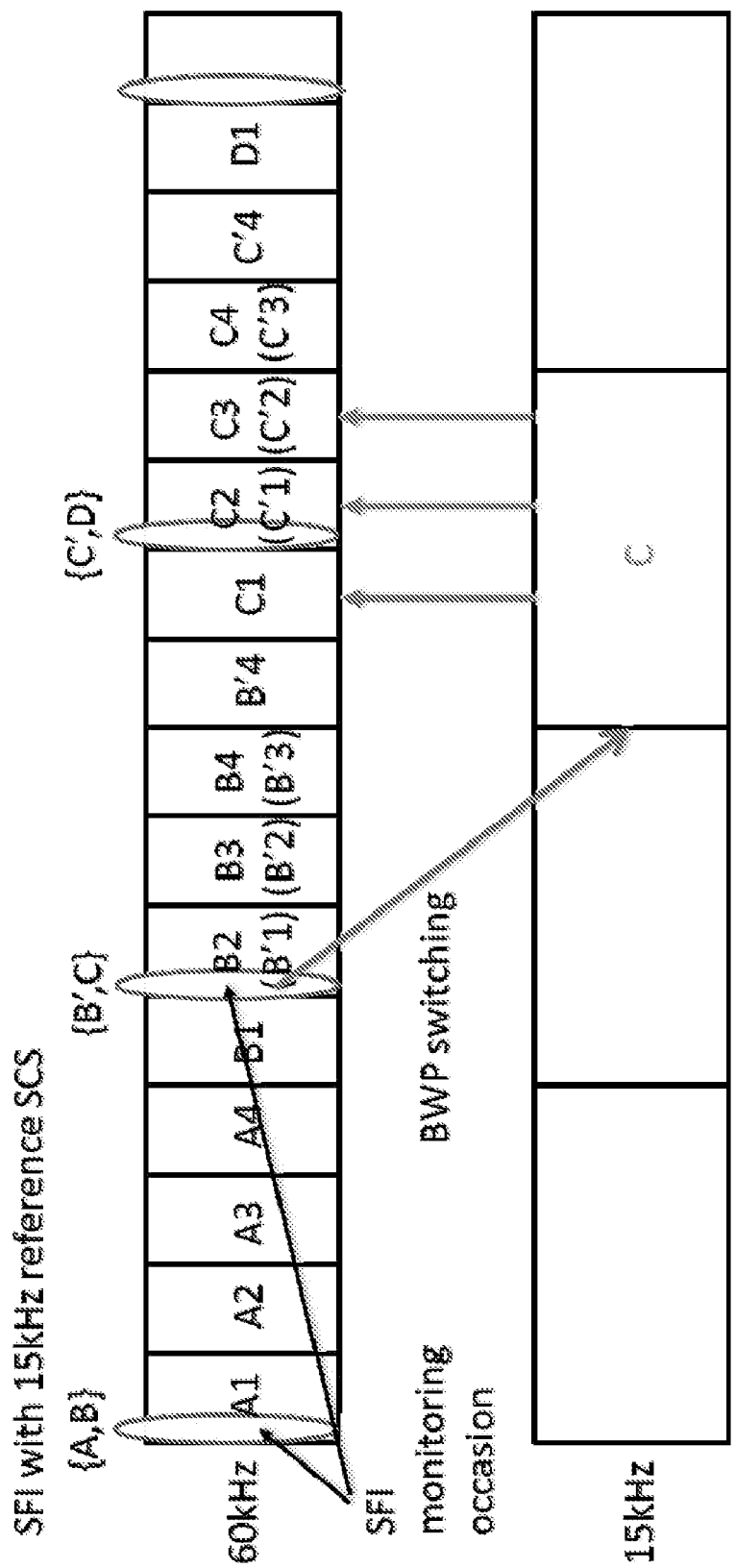
FIG. 8 is a diagram according to one exemplary embodiment.

In one embodiment, UE may determine slot configuration or slot format of a slot in a new/target active BWP based on slot format or slot configuration of most slots in a set of slot(s) if the slot is covered by the set of slot(s). FIG. 8 is an example. As shown in FIG. 8, the $3^{rd}$ slot of 15 kHz BWP comprises 4 60 kHz slots. According to SFI indexes {B', C} received in $6^{th}$ slot in 60 kHz BWP, {C} has the most slot format or slot configuration of 60 kHz slots. UE can determine slot format or slot configuration of the $3^{rd}$ slot of 15 kHz BWP as {C}.

In the case UE switches active BWP from a BWP with lower SCS to a BWP with higher SCS, if no other SFI index(s) indicated in the same slots), UE could apply the SFI index(s) received in original BWP to determine slot configuration. Assume SCS in new/target BWP is f1 (i.e. configuration of SCS is µ1) and reference SCS is f2 (i.e. configuration of reference SCS is µ2), f1>f2 (µ1>µ2). UE may decide $2^{(\mu 1-\mu 2)}$ consecutive slots in new active BWP where the first slot starts at a same time as a first slot for the reference SCS f2 and each symbol for the reference SCS f2 corresponds to $2^{(\mu 1-\mu 2)}$ consecutive symbols for the SCS f1. UE may truncate slot configuration/slot format of slot(s) which occur before UE finishes the active BWP switching. The remaining slot configuration may be applied to new active BWP.

When UE switches its active BWP, UE may apply SFI index(s) received before BWP switching on new/target active BWP. UE may be configured with SFI monitoring occasions in the new/target active BWP. SFI index (or indices) received in the new/target active BWP and SFI index(es) received before BWP switching could overlap in some slots or could indicates same slot(s). In this case, UE may not expect that these SFI index (or indices) indicating different slot configuration on overlapping slots of the new/target active BWP.

In one embodiment, UE may expect that the SFI index (or indices) may indicate same slot format/slot configuration on overlapping slots. If the SFI index (or indies) indicate different slot configurations or slot formats in overlapping slots of the new/target active BWP, UE may drop the SFI index (or indices) received before BWP switching and apply SFI index (or indices) received on the new/target active BWP.

In one embodiment, UE could apply SFI index (indices) received before BWP switching on new active BWP, and UE could also be configured SFI monitoring occasions on new active BWP. However some slots of the new/target active BWP are neither covered by SFI index(s) received before BWP switching nor SFI index(s) received on the new/target active BWP. In this case UE may follow semi-static slot configuration in this slots. In one embodiment, semi-static slot configuration can refer to tdd-UL-DL-Configuration-Common and/or tdd-ULDL-ConfigurationCommon2 and/or tdd-ULDL-ConfigDedicated. UE may follow transmitted direction indicated by scheduling DCI.

Based on an agreement in the RAN1#92bis meeting, a SFI index 255 could indicate that UE does not cancel any RRC configured UE-specific UL (Uplink) or DL (Downlink) transmission when receiving DCI format 2_0 indicating SFI index 255. If UE changes its active BWP, UE shall not apply the SFI index 255 received in original BWP to new/target active BWP, or UE may stop the cancellation of RRC configured UE-specific UL/DL transmission in new/target active BWP.

One possible procedure is UE does not apply the SFI index 255 on a new active BWP, but SFI index received before BWP switching other than SFI index 255 can be still applicable to the new active BWP. Another possible procedure is if SFI index (or indices) received before BWP switching contains SFI index 255, UE shall not apply the SFI index(s) to new/target active BWP.

When UE changes active BWP and applies the SFI index (or indices) indicated in original BWP to new/target active BWP, some slots of the new/target active BWP may not be covered by neither SFI index (or indices) received in original BWP nor SFI index (or indices) received in the new/target active BWP. If a slot in new active BWP is not covered by any SFI index(s), UE may follow semi-static configured slot format. In one embodiment, semi-static slot configuration can refer to tdd-UL-DL-Configuration Common and/or tdd-ULDL-ConfigurationCommon2 and/or tdd-UL-DL-ConfigDedicated. If any slot in new active BWP is not covered by any SFI index(s), UE may follow transmitted direction indicated by scheduling DCI.

If a new active BWP has a SCS larger than the SCS of original active BWP, the SFI monitoring period in new active BWP may not align to SFI index (or indices) received in original BWP. It may be hard for network to configure same slot configuration in the overlapping slots. FIG. 10 is an example. The slot configuration before BWP switching is "DDDXXXXXXXXUUU" in a 30 kHz slot. If UE switches active BWP from 30 kHz BWP to 60 kHz BWP, network cannot find a SFI index with proper reference SCS to let two SFI indices indicate same slot configuration/slot format in the overlapping slots.

A possible embodiment to solve this situation is that UE may shift or truncate the slot format indicated by SFI on active BWP to match two slot formats. Network may configure slot format "DDDXXXXXXXXUUU . . . " with 30 kHz reference SCS in monitoring occasion on active BWP. When UE receives the slot configuration or slot format, UE could shift or truncate the slot configuration or slot format to match the slot format indicated by SFI index(s) received before BWP switching.

Multiple DCI format 2_0 indicating different slot configuration or slot format for same slots may not only happen when UE switches its active BWP. When slot format or slot configuration indicated by SFI index(s) is longer than SFI monitoring period, multiple SFI indices may indicate different slot format/slot configuration for same slot. A similar procedure that UE may use is to match multiple slot formats or slot configurations for the same slots.

In one embodiment, UE may shift the start time of slot format indicated by SFI index (or indices) received on active BWP for several slots earlier such that two SFI indices indicate the same symbol direction in same slots. The shift of start time could be in number of slots, and the length of slot could be based on active BWP. In one embodiment, the shift of start time could be in number of symbols, and the length of symbol could be based on active BWP.

In one embodiment, UE may truncate the slot format or slot configuration for a number of symbols. The length of symbol could be based on active BWP. UE may apply a SFI based on a slot boundary with a reference subcarrier spacing. If UE receives a SFI on a slot with a SCS (i.e. 30 kHz) different from a reference SCS (i.e. 15 kHz) and slot boundary of the slot is not aligned with a slot of the reference SCS, UE may apply the SFI from a slot earlier than the slot where the UE received the SFI. UE may also apply part of a SFI on slot(s) with a SCS which different from a reference SCS if UE receives the SFI on a slot which is not aligned slot boundary of a slot with reference SCS.

For example, FIG. 13 assumes that UE receives SFI on a monitoring occasion on a slot which occurs on middle of a reference slot (i.e. reference SCS is assumed as 15 kHz). In this example, if UE receives a DCI format 2_0 indicating a SFI combination as {5, 1}, UE may apply {5, 1} aligning reference slot boundary. In the same example, UE may apply part of SFI {5} and know slot format of $2^{nd}$ slot of 30 kHz SCS is {DDDDDDDDXXXXXX}. UE may not be expected to apply SFI {5} on $2^{nd}$ slot of 30 kHz SCS slot as {DDDDDDDDDDDDDD}. In the same example, slot format of $3^{rd}$ slot of 30 kHz SCS can be as {UUUUUUUUUUUUUU} which is determined based on SFI{1}. In one embodiment, a slot with a reference SCS which is not aligned slot boundary of a reference SCS can refer to the slot satisfying that slot index of the slot mod ratio of SCS of the slot (numerator) and reference SCS (denominator) is not equal to 0.

In one embodiment, UE may exclude part of a SFI index if a slot for monitoring occasion for receiving DCI format 2_0 is not aligned with slot boundary of a slot with a reference SCS. UE may not apply a part of a SFI if a slot for monitoring occasion for receiving DCI format 2_0 is not aligned with slot boundary of a slot with a reference SCS. For example, as shown in FIG. 13, slot format of $2^{nd}$ slot of 30 kHz SCS is determined based on SFI {5}, and UE does not apply first half transmitted direction {DDDDDDD} indicated by SFI {5} on $2^{nd}$ slot of 30 kHz SCS. In this example, UE applies second half transmitted direction (DDDDXXX) indicated by SFI {5} on $2^{nd}$ slot of 30 kHz SCS.

In one embodiment, UE may cyclically shift the slot format indicated by SFI index(s) on active BWP for a number of symbols, such that two SFI index(s) indicates the same symbol direction in same slots. Once UE shifts or truncates the slot configuration or slot format indicated by SFI index (or indices), UE may operate the same shift on the following slot format or slot configuration indicated by received DCI format 2_0.

Figure 11:
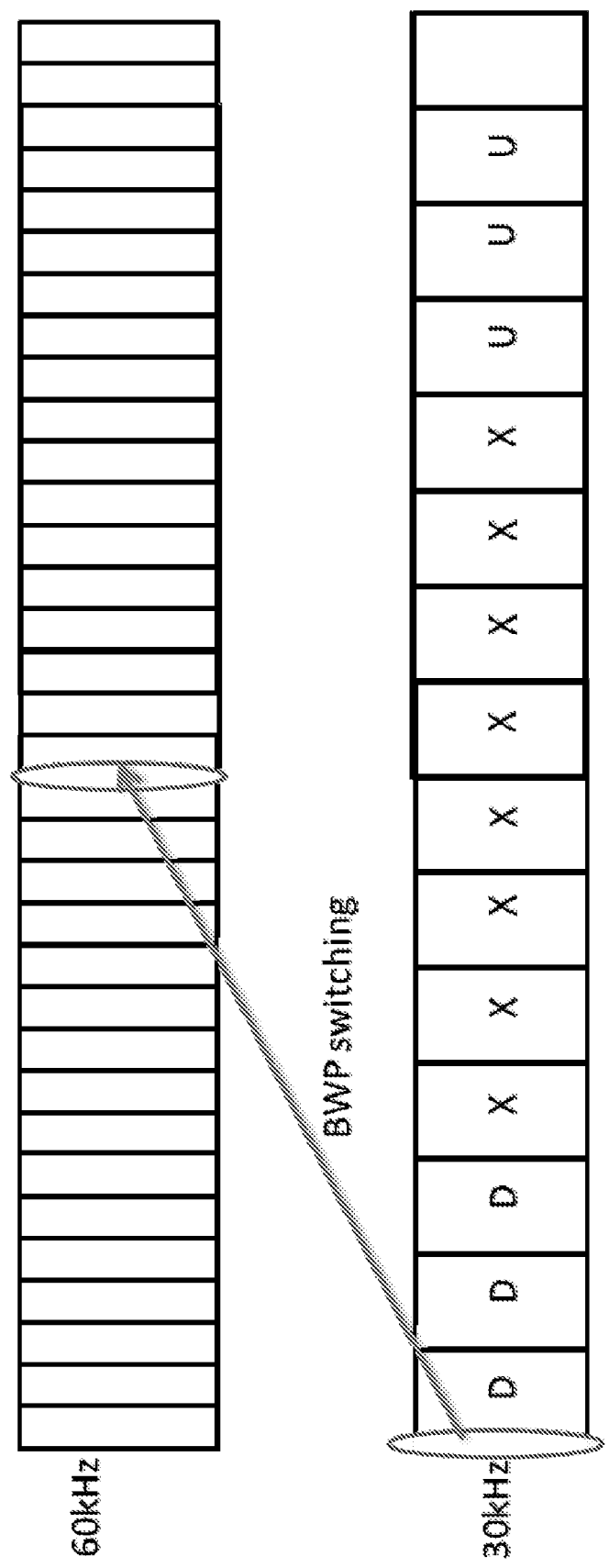
FIG. 11 is a diagram according to one exemplary embodiment.
Figure 12:
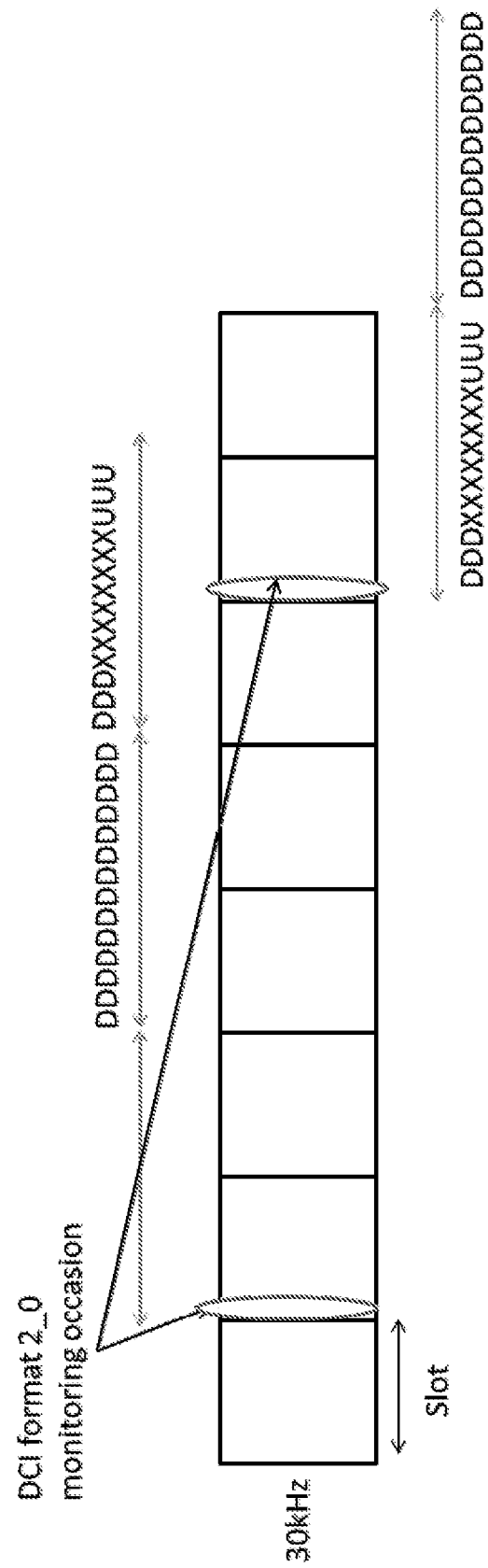
FIG. 12 is a diagram according to one exemplary embodiment.

For example, in FIG. 11, UE is configured to receive DCI format 2_0 in 2nd slot of 30 kHz BWP and 7th slot of 30 kHz BWP and a reference SCS is 15 kHz. In this example, the 7th slot is covered by a first DCI format 2_0 received in 2nd slot and a second DCI format 2_0 received in 7th slot. Based on first DCI format 2_0, UE may know slot format from 2nd slot to 7th slot. Slot format of 6th slot can be {DDDDDDXXXXXXXX} and/or slot format of 7th slot can be {XXXXXXXXUUUUUU} from first DCI format 2_0. In this example, UE may shift a number of symbols for a SFI index indicated by the second DCI format 2_0, which the SFI index indicates 7th slot (overlapping slot). UE may interpret the SFI index by cyclically shifting 14 symbols of active BWP such that slot format of 7th slot is the same as indicated by the first DCI format 2_0. Based on the shifted second DCI format 2_0, slot format of 7th slot can be {XXXXXXXXUUUUUU and/or slot format of 8th slot can be {DDDDDDXXXXXXXX}. Slot format/slot configuration of slot format of 9th slot to 12th slot can be determined based SFI indices indicated by the second DCI format 2_0 without shifting. UE may interpret the SFI index by truncate 14 symbols of active BWP such that slot format of 7th slot is the same as indicated by the first DCI format 2_0. Based on the truncated second DCI format 2_0, slot format of 7th slot can be {XXXXXXXXUUUUUU} and/or slot format of 8th slot can be {DDDDDDDDDDDDDD}.

Alternatively, a network may configure a UE with monitoring occasion(s) for receiving SFI index (or indices), wherein the monitoring occasion(s) are (always) aligned with slot boundary. In one embodiment, the slot boundary may refer to slot boundary of reference subcarrier spacing or slot boundary of each (configured) BWP. For example, if a UE is configured 3 BWPs with 15 kHz, 30 kHz, and 60 kHz respectively. Then when network configures SFI monitoring occasions to this UE, monitoring occasions may be on the slot boundary of all three BWPs.

In one embodiment, a table is generated based on a rule and/or an original table (Table 11.1.1-1 of 3GPP TS 38.213 V15.1.0). Each entry of the table could indicate a slot format for a slot. A slot format could indicate transmitted direction of each symbol in a slot. The transmitted direction of each symbol in a slot could be downlink, uplink, or flexible. In one embodiment, the rule could be adding a set of entries on the original table. An entry in the set could indicate a slot format where the first half of the slot format is the second half of a slot format indicated by a first entry in the original table, and/or the second half of the slot format is the half of a slot format indicated by a second entry in the original table. The first entry and second entry could be the same or different. The set of entries may not comprise slot format indicated by entries in the original table. [D] may refer to downlink transmission, {U} may refer to uplink transmission, and {X} may mean flexible.

In one embodiment, a network node (NW) and a UE (shall) have same understanding of the table. For example, in FIG. 15, UE receives a DCI format 2_0 indicating a slot combination as {A, B, C} wherein each SFI index (i.e. {A}, {B}, {C}) corresponds to an entry of the table. In this example, slot format indicated by SFI index {A} may be {XXXXUUUXXXXXXX}, slot format indicated by SFI index {B} may be {DDDDDDDDDDDDDD} (i.e. {B}={0}), and/or slot format indicated by SFI index {C} may be {DDDDXXXDDDDDDD}. In this example, slot format of $2^{nd}$ slot of 30 kHz BWP is {XXXXXXXXUUUUU} and/or $3^{rd}$ slot of 30 kHz BWP is {XXXXXXXXXXXXXX} and/or slot format of $4^{th}$ slot to $7^{th}$ slot can be indicated, respectively.

In one embodiment, if SCS of a BWP is 4 times of a reference SCS, NW may configure monitoring occasion in the BWP with a restriction aligning slot boundary of reference SCS and/or aligning half slot boundary of reference SCS. The set of entries may exclude an entry indicating a slot format that UE (i.e. slot format as {DDDDDDD-UUUUUUU}). The set of entries may include an entry indicating a slot format that UE does not have enough transition time or transition gap between downlink transmission and uplink transmission (i.e. slot format as {DDDDDDDUUUUUUU}). In one embodiment, NW may not be allowed to transmit a DCI format 2_0 for indicating an entry that there is no transition time or transition gap between DL symbol and uplink symbol for a slot with same SCS as the reference SCS. In one embodiment, NW shall not transmit a SFI index in the table indicating such as {DDDDDDDUUUUUUU} on a slot with the same SCS with the reference SCS. UE does not be expected to receive a SFI index indicating a slot format without enough transition time/transition gap in a slot. More specifically, SCS of the slot may be the same as the reference SCS. In one embodiment, the rule can be one or more rules for determining SFI table in the working assumption discussed in the Final Chairman's Note of 3GPP TSG RAN WG1 Meeting #91 (Reno, USA, 27 Nov.-1 Dec. 2017).

In one embodiment, a UE could be configured with a first SCS. The UE could be configured to receive DCI format 2_0 in a first three OFDM symbols in a slot with a second SCS, wherein the UE does not expect that slot index of the slot mod ratio of the second SCS (numerator) to the first SCS (denominator) is not equal to 0. In other words, the UE may expect that a value M is not equal to 0, wherein M is equal to S mod T/U, S is a slot index of the slot, T is the second SCS value, and U is the first SCS value. The value of the first SCS could be smaller than or equal to value of the second SCS.

In one embodiment, the UE could be configured to receive DCI format 2_0 in a first three OFDM symbols in a slot with a second SCS, wherein the UE does not expect that the first three OFDM symbols is not overlapped or aligned with beginning of a slot with the first SCS. The UE does not expect that the first three OFDM symbols do not start at a beginning of a slot with the first SCS. The value of the first SCS is smaller than or equal to value of the second SCS.

As shown in FIG. 6, SFI monitoring occasion in $1^{st}$ slot of 60 kHz indicates slot format {A1, A2, A3, A4} aligns with the $1^{st}$ slot of 15 kHz slot, and slot format {B1, B2, B3, B4} aligns with the $2^{nd}$ slot of 15 kHz slot. In other words, SFI monitoring occasion in $1^{st}$ slot of 60 kHz indicates SFI which is matched or aligned with slot boundary of 15 kHz slot. SFI monitoring occasion in $6^{th}$ slot of 60 kHz indicates slot format {B'1, B'2, B'3, B'4} which is not aligned with the slot of 15 kHz slot nor the slot format {C1, C2, C3, C4}. In addition, SFI monitoring occasion in $6^{th}$ slot of 60 kHz indicates slot format across slot boundary of 15 kHz slot.

In one embodiment, a UE could be configured with a first SCS. The UE could be configured to receive DCI format 2_0 on a monitoring occasion such that a SFI index in the DCI format 2_0 indicates slot format of a number of consecutive slots with the second SCS, wherein the number of consecutive slots aligns slot boundary of a slot with the first SCS.

In one embodiment, the UE could be configured to receive DCI format 2_0 on a monitoring occasion such that a time period containing a number of consecutive slots with a second SCS associated with a slot format in the combination of slot formats indicated by a SFI index in the DCI format 2_0 aligns slot boundary of a slot with the first SCS. The UE does not expect to be configured to receive DCI format 2_0 on a monitoring occasion such that a time period containing a number of consecutive slots with the second SCS associated with a slot format in the combination of slot formats indicated by a SFI index in the DCI format 2_0 aligns slot boundary of a slot with the first SCS.

In one embodiment, the first SFI index in the DCI format 2_0 could indicate slot format of a number of consecutive slot with the second SCS, wherein the number of consecutive slot begins from the slot where the UE receives the DCI format 2_0. The first SFI index in the DCI format 2_0 could also indicate slot format of a number of consecutive slot with the second SCS, wherein the number of consecutive slot begins from the slot comprising the monitoring occasion. The value of the first SCS could be smaller than or equal to value of the second SCS.

In one embodiment, a NW could configure a UE with a first SCS. A NW could also configure a UE with a second SCS. A NW is not allowed to configure (or prevents from configuring) a UE to receive DCI format 2_0 on an monitoring occasion such that a SFI index in the DCI format 2_0 indicates slot format of a number of consecutive slots with the second SCS and the number of consecutive slots does not align slot boundary of a slot with the first SCS. Furthermore, a NW is not allowed to configure (or prevents from configuring) a UE to receive DCI format 2_0 on a monitoring occasion such that a number of consecutive slots indicated by a SFI index in the DCI format 2_0 does not align slot boundary of a slot with the first SCS. The value of the first SCS could be smaller than or equal to value of the second SCS. The first SCS could be a reference SCS.

In one embodiment, when the NW configures the UE to receive DCI format 2_0 on a monitoring occasion on an active DL BWP, if a number of consecutive slots with the second SCS indicated by an SFI index may not align or match slot boundary of a slot with the first SCS, the NW is not allowed to provide (or prevents from providing) such configuration to the UE. A monitoring occasion for DCI format 2_0 could be determined based on at least a slot-level periodicity, slot level offset, and/or a bit-map, wherein the bit-map indicates a monitoring occasion for DCI format 2_0 within a slot with a second SCS. A monitoring occasion for a DCI format 2_0 may only occur in the first three OFDM symbols in a slot with a second SCS.

In one embodiment, time duration of the monitoring occasion for a DCI format 2_0 could be determined based on time duration of a control resource set (CORESET). If the monitoring occasion occupies two OFDM symbols, the monitoring occasion could start from the first or the second OFDM symbol of the slot with a second SCS or from the first or the second OFDM symbol or the third OFDM symbol of the slot with a second SCS. The first SCS could be different from the second SCS. Furthermore, the first SCS could be smaller than the second SCS.

Figure 16:
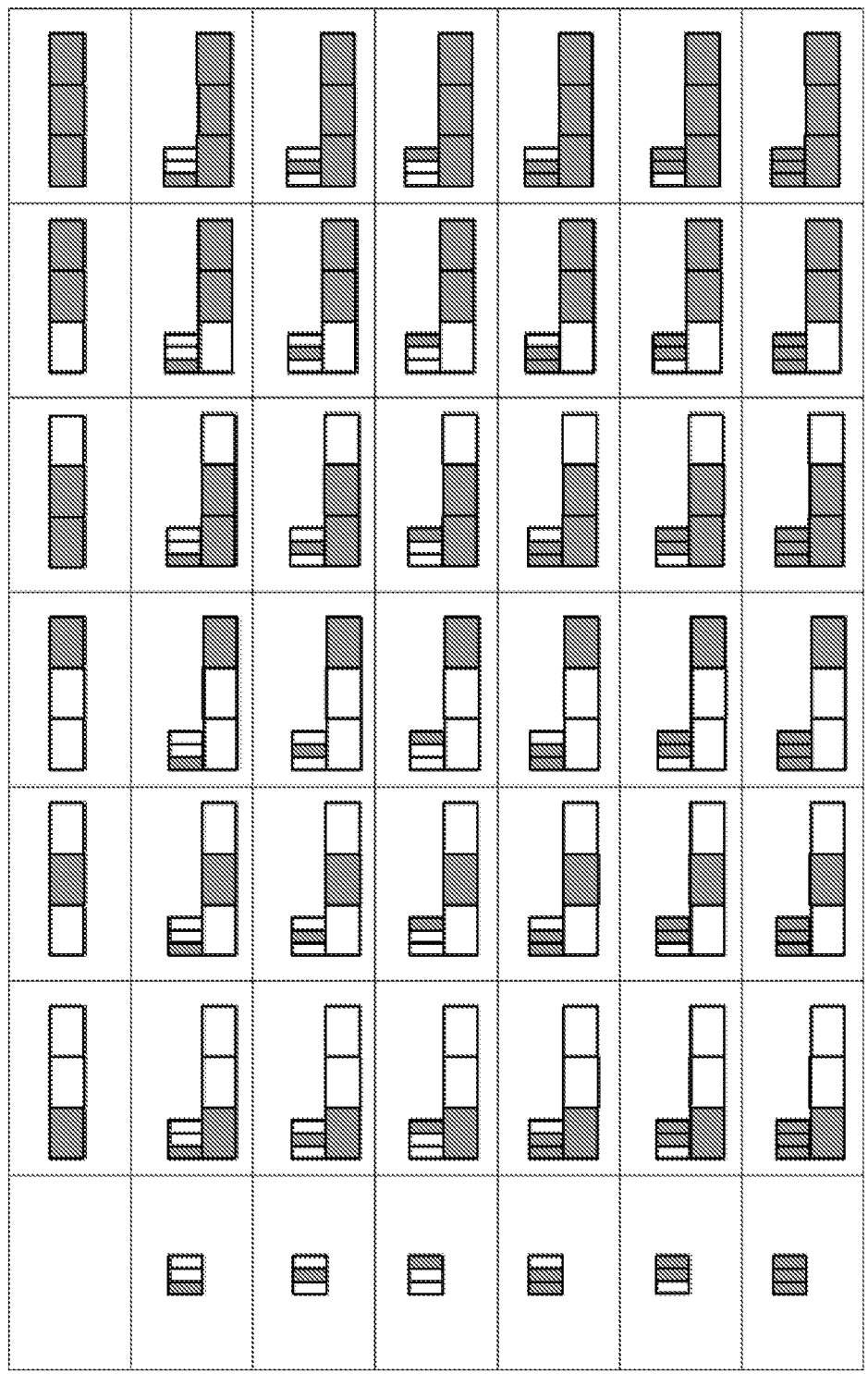
FIG. 16 is a diagram according to one exemplary embodiment.

FIG. 16 illustrates 36 possible combined cases of a first monitoring occasion with 15 kHz and a second monitoring occasion with a 60 kHz. The first monitoring occasion could be used for SFI monitoring in a BWP with 15 kHz SCS. The second monitoring occasion could be used for SFI monitoring in a BWP with 60 kHz SCS. The first column in FIG. 8 illustrates 6 possible monitoring occasions with 60 kHz SCS. The first row in FIG. 8 illustrates 6 possible monitoring occasions with 15 kHz SCS.

In one embodiment, a UE is indicated to use a first slot format, wherein the first half of the first slot format is the same as the second half of a second slot format. The second half of the first slot format could the same as the first half of a third slot format. The first slot format generated based on that first half of the first slot format could be the same as second half of the second slot format, and/or the second half of the first slot format could the same as first half of the third slot format.

In one embodiment, a slot format could be indicated by an entry index indicating a slot format for a slot. The first slot format can be indicated by a first entry index, the second slot format can be indicated by a second entry index, and the third slot format can be indicated by a third entry index. The first entry index can be the same as the second entry index and/or the third entry index. Alternatively, the first entry index can be different from the second entry index and/or the third entry index. The second entry index can be the same as the first entry index and/or the third entry index. Alternatively, the second entry index can be different from the first entry index and/or the third entry index. The third entry index can be the same as the second entry index and/or the first entry index. Alternatively, the third entry index can be different from the second entry index and/or the first entry index.

In one embodiment, each pair of the first entry index and the second entry index and the third entry index may be the same or different. Each pair of the first slot format and the second slot format and the third slot format may be the partially or fully the same. The second half of the first slot format may be different from the first half of the second slot format. Alternatively, first half of the first slot format may be different from the second half of a third slot format. Each pair of the first slot format and the second slot format and the third slot format may be the partially or fully the different. A table can comprise at least the first slot format and/or the second slot format and/or the third slot format. Each entry of the table can indicate a slot format for a slot. A slot format can indicate transmitted direction of each symbol in a slot. The transmitted direction of each symbol in a slot can be downlink, uplink, or flexible. {D} may refer to downlink transmission, {U} may refer to uplink transmission, and {X} may refer flexible.

In one embodiment, a network node (NW) and a UE may have same understanding of the table. For example, in FIG. 15, UE receives a DCI format 2_0 indicating a slot combination as {A, B, C} wherein each SFI index (i.e. {A}, {B}, {C}) is corresponding to an entry of the table. In this example, slot format indicated by SFI index {A} may be {XXXXUUUXXXXXXX}, slot format indicated by SFI index {B} may be {DDDDDDDDDDDDDD} (i.e. {B}={0}), and/or slot format indicated by SFI index {C} may be {DDDDXXXDDDDDDD}. In this example, slot format of $2^{nd}$ slot of 30 kHz BWP is {XXXXXXXXUUUUUU} and/or $3^{rd}$ slot of 30 kHz BWP is {XXXXXXXXXXXXXX} and/or slot format of $4^{th}$ slot to $7^{th}$ slot can be indicated, respectively. If SCS of a BWP is 4 times of a reference SCS, NW may configure monitoring occasion in the BWP with a restriction aligning slot boundary of reference SCS and/or aligning half slot boundary of reference SCS.

In one embodiment, the table may exclude an entry indicating a slot format that UE does not have enough transition time/transition gap between downlink transmission and uplink transmission (i.e. slot format as {DDDDDDDUUUUUUU}). The table can comprise an entry with no transition time and/or transition gap between downlink transmission and uplink transmission.

In one embodiment, NW may not be allowed to transmit a DCI format 2_0 for indicating an entry that there is no transition time or transition gap between DL symbol and uplink symbol for a slot with same SCS as the reference SCS. NW may not transmit a SFI index in the table indicating such as {DDDDDDDUUUUUUU} on a slot with the same SCS as the reference SCS.

In one embodiment, UE may not be expected to receive a SFI index indicating a slot format without enough transition time/transition gap in a slot. More specifically, SCS of the slot may be the same as the reference SCS. The table can at least comprise one or more rules for determining SFI table in the working assumption discussed in the Final Chairman's Note of 3GPP TSG RAN WG1 Meeting #91 (Reno, USA, 27 Nov.-1 Dec. 2017).

Figure 17:
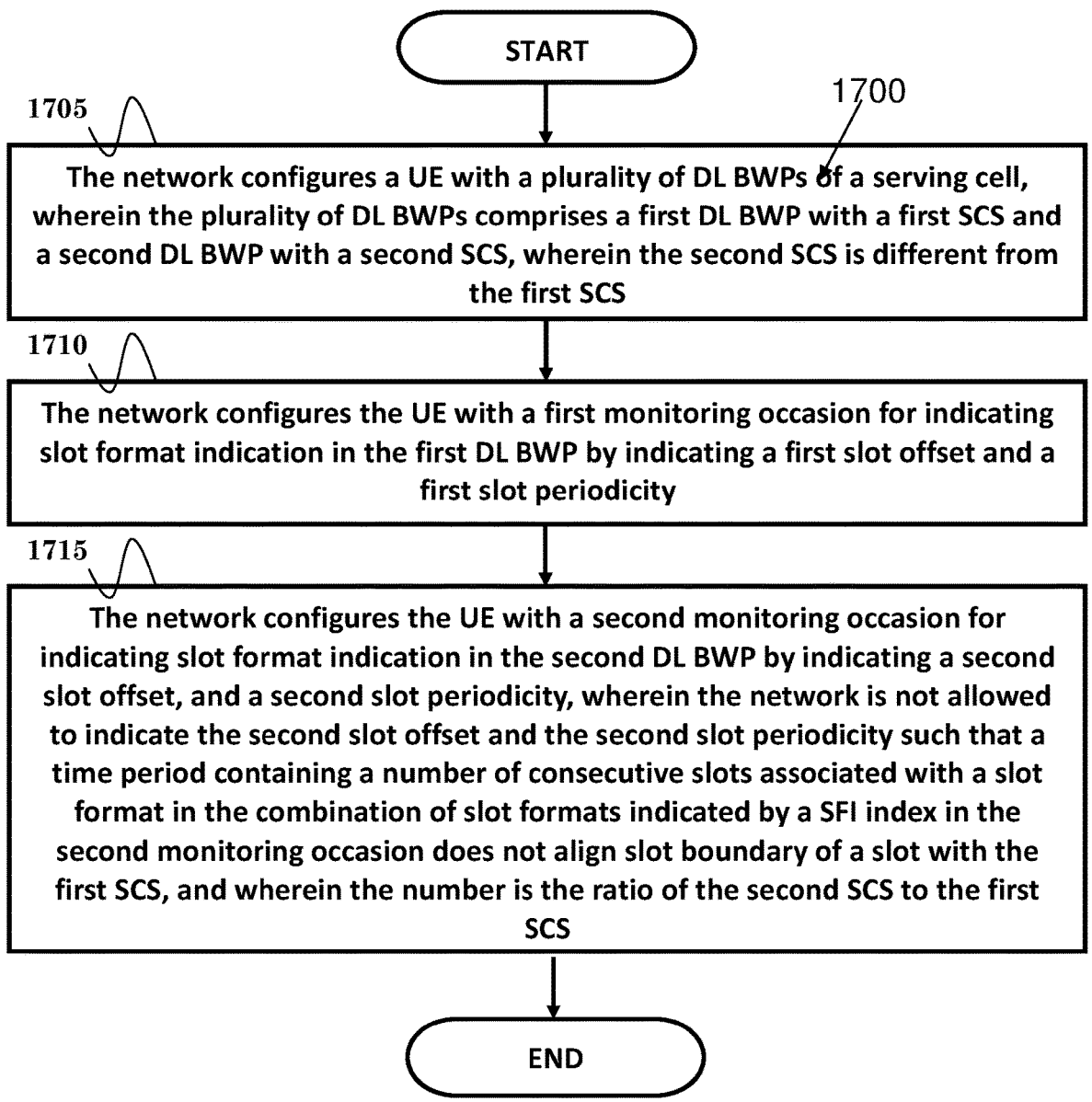
FIG. 17 is a flow chart according to one exemplary embodiment.

FIG. 17 is a flow chart 1700 according to one exemplary embodiment from the perspective of a network. In step 1705, the network configures a UE with a plurality of DL BWPs of a serving cell, wherein the plurality of DL BWPs comprises a first DL BWP with a first SCS and a second DL BWP with a second SCS, wherein the second SCS is different from the first SCS. In step 1710, the network configures the UE with a first monitoring occasion for indicating SFI in the first DL BWP by indicating a first slot offset and a first slot periodicity. In step 1715, the network configures the UE with a second monitoring occasion for indicating SFI in the second DL BWP by indicating a second slot offset, and a second slot periodicity, wherein the network is not allowed to indicate the second slot offset and the second slot periodicity such that a time period containing a number of consecutive slots associated with a slot format in the combination of slot formats indicated by a SFI index in the second monitoring occasion does not align slot boundary of a slot with the first SCS, and wherein the number is the ratio of the second SCS to the first SCS.

In one embodiment, the second monitoring occasion could occupy one of the following OFDM (Orthogonal Frequency Division Multiplexing) symbols in a slot: (i) the first OFDM symbol, (ii) the second OFDM symbol, (iii) the third OFDM symbol, (iv) the first OFDM symbol and the second OFDM symbol, (v) the second OFDM symbol and the third OFDM symbol, or (vi) the first OFDM symbol, the second OFDM symbol, and the third OFDM symbol. The SCS of the number of consecutive slots could be the second SCS. The number of consecutive slots could start from a slot that comprises the second monitoring occasion.

In one embodiment, if the first SCS is 15 kHz and the second SCS is 60 kHz, the network may not be allowed to configure the second slot periodicity and the second slot offset for the second monitoring occasion such that a time period containing the four consecutive slots with 60 kHz associated with a slot format in the combination of slot formats indicated by a SFI index from the slot with 60 kHz comprising the second monitoring occasion is not aligned with a slot with 15 kHz.

In one embodiment, the network could configure the second monitoring occasion in the slot with the second SCS such that the beginning of the slot with the second SCS is aligned with beginning of the slot with the first SCS. The network could also configure the second slot periodicity for the second monitoring occasion as integer number of the ratio of the second SCS to the first SCS. Furthermore, the network could configure the second slot offset for the second monitoring occasion satisfying that the second slot periodicity mod the second slot offset is 0.

In one embodiment, the first SCS could be the lowest SCS among SCS of the plurality of DL BWPs. The first periodicity could be different from the second periodicity. The first slot offset could be different from the second slot offset. The first length of the first periodicity could be different from a second length of the second periodicity. The first periodicity could comprise a first number of slot(s) with the first SCS and the second periodicity comprises a second number of slot(s) with the second SCS.

In one embodiment, the first monitoring occasion within a slot with the first SCS may not be aligned with the second monitoring occasion within a slot with the second SCS. The beginning of the second monitoring occasion may not be aligned with the beginning of the first monitoring occasion. The ending of the second monitoring occasion may not be aligned with the ending of the first monitoring occasion. The second monitoring occasion may not overlap with the first monitoring occasion in time domain.

In one embodiment, if the second monitoring occasion overlaps with the first monitoring occasion in time domain, the beginning of the second monitoring occasion may not be aligned with the beginning of the first monitoring occasion. If the first SCS is 15 kHz, the second SCS is 60 kHz and the first monitoring occasion starts from the first symbol of a slot with the first SCS, the second monitoring occasion may start from the second symbol of a slot with the second SCS. If the first SCS is 15 kHz, the second SCS is 60 kHz and the first monitoring occasion starts from the second symbol of the third symbol of a slot with the first SCS, the second monitoring occasion may start from the first symbol of a slot with the second SCS.

Referring back to FIGS. 3 and 4, in one exemplary embodiment of a UE, the device 300 includes a program code 312 stored in the memory 310. The CPU 308 could execute program code 312 to enable the network (i) to configure a UE with a plurality of DL BWPs of a serving cell, wherein the plurality of DL BWPs comprises a first DL BWP with a first SCS and a second DL BWP with a second SCS, wherein the second SCS is different from the first SCS, (ii) to configure the UE with a first monitoring occasion for indicating SFI in the first DL BWP by indicating a first slot offset and a first slot periodicity, and (iii) to configure the UE with a second monitoring occasion for indicating SFI in the second DL BWP by indicating a second slot offset, and a second slot periodicity, wherein the network is not allowed to indicate the second slot offset and the second slot periodicity such that a time period containing a number of consecutive slots associated with a slot format in the combination of slot formats indicated by a SFI index in the second monitoring occasion does not align slot boundary of a slot with the first SCS, and wherein the number is the ratio of the second SCS to the first SCS. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network, comprising:
   the network configures a UE (User Equipment) with a plurality of DL (Downlink) BWPs (Bandwidth Parts) of a serving cell, wherein the plurality of DL BWPs comprises a first DL BWP with a first SCS (Sub-Carrier Spacing) and a second DL BWP with a second SCS, wherein the second SCS is different from the first SCS;
   the network configures the UE with a first monitoring occasion for indicating slot format indication (SFI) in the first DL BWP by indicating a first slot offset and a first slot periodicity;
   the network configures the UE with a second monitoring occasion for indicating slot format indication (SFI) in the second DL BWP by indicating a second slot offset, and a second slot periodicity, wherein the network is not allowed to indicate the second slot offset and the second slot periodicity such that a time period containing a number of consecutive slots associated with a slot format in the combination of slot formats indicated by a SFI index in the second monitoring occasion does not align slot boundary of a slot with the first SCS, and wherein the number is the ratio of the second SCS to the first SCS.

2. The method of claim 1, wherein the second monitoring occasion occupies one of the following OFDM (Orthogonal Frequency Division Multiplexing) symbols in a slot: (i) the first OFDM symbol, (ii) the second OFDM symbol, (iii) the third OFDM symbol, (iv) the first OFDM symbol and the second OFDM symbol, (v) the second OFDM symbol and the third OFDM symbol, or (vi) the first OFDM symbol, the second OFDM symbol, and the third OFDM symbol.

3. The method of claim 1, wherein SCS of the number of consecutive slots is the second SCS.

4. The method of claim 1, wherein the number of consecutive slots starts from a slot that comprises the second monitoring occasion.

5. The method of claim 1, wherein if the first SCS is 15 kHz and the second SCS is 60 kHz, the network is not allowed to configure the second slot periodicity and the second slot offset for the second monitoring occasion such that a time period containing the four consecutive slots with 60 kHz associated with a slot format in the combination of slot formats indicated by a SFI index from the slot with 60 kHz comprising the second monitoring occasion is not aligned with a slot with 15 kHz.

6. The method of claim 1, wherein the network shall configure the second monitoring occasion in the slot with the second SCS such that the beginning of the slot with the second SCS is aligned with beginning of the slot with the first SCS.

7. The method of claim 1, wherein the network shall configure the second slot periodicity for the second monitoring occasion as integer number of the ratio of the second SCS to the first SCS.

8. The method of claim 1, wherein the network shall configure the second slot offset for the second monitoring occasion satisfying that the second slot periodicity mod the second slot offset is 0.

9. The method of claim 1, wherein the first SCS is the lowest SCS among SCS of the plurality of DL BWPs.

10. The method of claim 1, wherein the first periodicity is different from the second periodicity.

11. The method of claim 1, wherein the first slot offset is different from the second slot offset.

12. The method of claim 1, wherein a first length of the first periodicity is different from a second length of the second periodicity.

13. The method of claim 1, wherein the first periodicity comprises a first number of slot(s) with the first SCS and the second periodicity comprises a second number of slot(s) with the second SCS.

14. The method of claim 1, wherein the first monitoring occasion within a slot with the first SCS is not aligned with the second monitoring occasion within a slot with the second SCS.

15. The method of claim 1, wherein the beginning of the second monitoring occasion is not aligned with the beginning of the first monitoring occasion.

16. The method of claim 1, wherein the ending of the second monitoring occasion is not aligned with the ending of the first monitoring occasion.

17. The method of claim 1, wherein the second monitoring occasion does not overlap with the first monitoring occasion in time domain.

18. The method of claim 1, wherein if the second monitoring occasion overlaps with the first monitoring occasion in time domain, the beginning of the second monitoring occasion is not aligned with the beginning of the first monitoring occasion.

19. The method of claim 1, wherein if the first SCS is 15 kHz, the second SCS is 60 kHz and the first monitoring occasion starts from the first symbol of a slot with the first SCS, the second monitoring occasion starts at least from the second symbol of a slot with the second SCS.

20. The method of claim 1, wherein if the first SCS is 15 kHz, the second SCS is 60 kHz and the first monitoring occasion starts from the second symbol or the third symbol of a slot with the first SCS, the second monitoring occasion starts at least from the first symbol of a slot with the second SCS.

* * * * *